United States Patent
Fukuda et al.

(10) Patent No.: US 9,834,694 B2
(45) Date of Patent: Dec. 5, 2017

(54) METHOD OF PRINTING PIGMENT-BASED INKS INCLUDING INK SETS, INKS AND PRINTERS THEREFOR

(71) Applicant: Memjet Technology Ltd., Dublin (IE)

(72) Inventors: Teruyuki Fukuda, Wakayama (JP); Satoshi Tanaka, Wakayama (JP); Adrian Bisson, Liverpool (GB); Roger Davey, Sydney (AU); Richard Myors, Sydney (AU); Stephen Bernard, Sydney (AU); Philippa Read, Sydney (AU); Iain Blake, Sydney (AU); Steven Carter, Sydney (AU)

(73) Assignee: MEMJET TECHNOLOGY LIMITED. (IE)

( * ) Notice: Subject to any disclaimer, the term of this patent is extended or adjusted under 35 U.S.C. 154(b) by 145 days.

(21) Appl. No.: 14/532,768

(22) Filed: Nov. 4, 2014

(65) Prior Publication Data
US 2015/0138271 A1 May 21, 2015

Related U.S. Application Data

(60) Provisional application No. 61/906,060, filed on Nov. 19, 2013.

(51) Int. Cl.
*C09D 11/38* (2014.01)
*C09D 11/40* (2014.01)
(Continued)

(52) U.S. Cl.
CPC ............ *C09D 11/38* (2013.01); *B41M 5/0023* (2013.01); *C08K 3/04* (2013.01); *C08K 5/06* (2013.01);
(Continued)

(58) Field of Classification Search
None
See application file for complete search history.

(56) References Cited

U.S. PATENT DOCUMENTS

| 6,387,168 B1 | 5/2002 | Koitabashi et al. |
| 6,790,878 B2 | 9/2004 | Kurabayashi |
| 2004/0020407 A1* | 2/2004 | Kato ................... C09B 67/0013 106/31.6 |
| 2004/0066425 A1* | 4/2004 | Togashi ................ B41J 2/0459 347/9 |

(Continued)

FOREIGN PATENT DOCUMENTS

| EP | 0947567 A1 | 10/1999 |
| EP | 1088863 A1 | 4/2001 |

OTHER PUBLICATIONS

International Search Report and Written Opinion for PCT/EP2014/073613 dated Feb. 16, 2015, 8 pages.

*Primary Examiner* — Laura Powers
(74) *Attorney, Agent, or Firm* — Cooley LLP

(57) ABSTRACT

A method of inkjet printing includes the steps of: printing a first ink onto a print medium, the first ink including a first self-dispersible pigment, the first ink having a first pigment content A; and subsequently printing a second ink onto the print medium at least partially over the first ink, the second ink including a second pigment and a polymeric dispersant encapsulating the second pigment, the second ink having a second pigment content B. The first self-dispersible pigment and the second pigment have a same color; the pigment content A of the first ink and the pigment content B of the overprinted second ink have a relationship $0.8 \le A/B \le 1.2$; and a polymer acid value of the polymeric dispersant is in the range of 100 to 170.

16 Claims, 3 Drawing Sheets

(51) Int. Cl.

| | |
|---|---|
| *C09D 125/14* | (2006.01) |
| *C09D 11/322* | (2014.01) |
| *B41M 5/00* | (2006.01) |
| *C08K 5/47* | (2006.01) |
| *C08K 5/06* | (2006.01) |
| *C08K 3/04* | (2006.01) |
| *B41J 2/01* | (2006.01) |
| *B41J 2/21* | (2006.01) |

(52) U.S. Cl.
CPC .............. *C08K 5/47* (2013.01); *C09D 11/322* (2013.01); *C09D 11/40* (2013.01); *C09D 125/14* (2013.01); *B41J 2/2107* (2013.01)

(56) References Cited

U.S. PATENT DOCUMENTS

| | | | |
|---|---|---|---|
| 2005/0012796 A1* | 1/2005 | Doi ........................ | C09D 11/30 347/100 |
| 2010/0033524 A1* | 2/2010 | Arai ....................... | C09D 11/54 347/9 |
| 2011/0043572 A1* | 2/2011 | Xie ....................... | B41J 2/04573 347/57 |
| 2013/0027476 A1* | 1/2013 | Mori ..................... | C09D 11/322 347/56 |
| 2013/0083116 A1* | 4/2013 | Fukaya ................ | C09D 11/324 347/20 |
| 2014/0098167 A1* | 4/2014 | Bernard ............... | B41M 7/0018 347/96 |

\* cited by examiner

METHOD OF PRINTING PIGMENT-BASED INKS INCLUDING INK SETS, INKS AND PRINTERS THEREFOR

FIELD OF THE INVENTION

This invention relates to a method of printing pigment-based inks as well as ink sets, inks and printers for carrying out said method. It has been developed primarily for optimizing optical density and fixability of printed inks, as well as optimizing printhead lifetimes.

BACKGROUND OF THE INVENTION

The present Applicant has developed a plethora of high-speed inkjet printers employing stationary Memjet® printheads which extend across a media width and print in a single pass of the print media. By contrast, most inkjet printers utilize a scanning printhead, which traverses across the media width printing in swathes.

High-speed pagewidth printing necessarily places additional demands on the design of the printhead compared to traditional types of inkjet printhead. The nozzle devices must have a self-cooling design, high chamber refill rates and high thermal efficiency. To this end, the Applicant has developed a range of thermal bubble-forming printheads, including those with suspended resistive heater elements (as described in, for example, U.S. Pat. Nos. 6,755,509; 7,246,886; 7,401,910; and 7,658,977, the contents of which are incorporated herein by reference) and those with embedded ("bonded") resistive heater elements (as described in, for example, U.S. Pat. Nos. 7,377,623; 7,431,431; US 2006/250453; and U.S. Pat. No. 7,491,911, the contents of which are incorporated herein by reference).

Nozzle devices having uncoated suspended heater elements offer the advantages of efficient heat transfer from the heater element to the ink and self-cooling characteristics, resulting in high print speeds. However, uncoated suspended heater elements are typically less robust than their bonded counterparts.

One approach to improving printhead lifetime is to coat the heater elements with a layer of protective coating. For example, U.S. Pat. No. 6,719,406 (assigned to the present Applicant) describes suspended heater elements having a conformal protective coating, which improves the robustness of the heater element and improves printhead lifetime. However, protective coatings are undesirable for a number of reasons—they reduce the efficiency of heat transfer from the resistive heater elements to the surrounding ink; they consequently affect the self-cooling characteristics; and they introduce additional MEMS fabrication challenges.

Therefore, it is generally preferable to employ uncoated ("naked") heater elements in Memjet® printheads. To some extent, the choice of heater material can mitigate the effects of using uncoated heater elements, which are directly exposed to the ink. For example, U.S. Pat. No. 7,431,431 describes the use of a self-passivating titanium aluminium nitride heater element, which has improved lifetime compared to more conventional materials used in the art. Nevertheless, there is still a need to improve the lifetimes of Memjet® printheads employing uncoated heater elements, which are susceptible to failure via both kogative and corrosive mechanisms.

Aqueous dye-based inks are considered to be well-suited for use in high-speed printing, because they usually exhibit minimal kogation compared to pigment-based inks. However, dye-based inks typically have the disadvantages of poorer lightfastness, poorer optical densities and poorer fixability ("rub-fastness") compared to pigment-based inks. The optical density of black ink is particularly important, because consumers generally prefer printed text to be a rich, crisp black color without any hints of grayness.

EP-A-0947567 describes an aqueous ink formulation comprising a self-dispersible carbon black pigment and a resin encapsulating a coloring material.

JP 2001-288390 describes the use of two different black inks having different surface tensions for reducing drying times.

U.S. Pat. No. 5,976,233 describes an aqueous inkjet ink comprising a self-dispersible pigment, trimethylolpropane, diethyleneglycol and glycerol.

It would desirable to provide a method of printing pigment-based inks from a high-speed printhead, such as the Applicant's Memjet® printhead. It would further be desirable to print pigment-based inks whilst optimizing optical density, fixability and/or printhead lifetime.

SUMMARY OF THE INVENTION

In a first aspect, there is provided a method of inkjet printing comprising the steps of:

printing a first ink onto a print medium, the first ink comprising a first self-dispersible pigment, the first ink having a first pigment content A; and subsequently printing a second ink onto the print medium at least partially over the first ink, the second ink comprising a second pigment and a polymeric dispersant encapsulating the second pigment, the second ink having a second pigment content B, wherein:

the first self-dispersible pigment and the second pigment have a same color;

the first pigment content A and the second pigment content B have a relationship $0.8 \leq A/B \leq 1.2$; and a polymer acid value of the polymeric dispersant is in the range of 100 to 170.

In a second aspect, there is provided an inkjet printer comprising:

a media feed mechanism defining a media feed path and a media feed direction;

a fixed inkjet printhead extending at least partially across the media feed path, the printhead comprising a first ink channel positioned upstream of a second ink channel relative to the media feed direction, each of the first and second ink channels comprising at least one respective row of nozzles extending longitudinally along the printhead, a first ink reservoir containing a first ink in fluid communication with the first ink channel, the first ink comprising a first self-dispersible pigment, the first ink having a first pigment content A; and a second ink reservoir containing a second ink in fluid communication with the second ink channel, the second ink comprising a second pigment and a polymeric dispersant encapsulating the second pigment, the second ink having a second pigment content B, wherein:

the first self-dispersible pigment and the second pigment have a same color;

the first pigment content A and the second pigment content B have a relationship $0.8 \leq A/B \leq 1.2$; and a polymer acid value of polymeric dispersant is in the range of 100 to 170.

As demonstrated by the experimental data presented herein, the present inventors have found that the order of printing the first and second inks and the ratio of pigments in the first and second inks have a surprising effect on black optical density. Advantageously high optical densities are achieved when the first ink is printed before the second ink, and when the first pigment content A and the second pigment content B have the relationship $0.8 \leq A/B \leq 1.2$.

As further demonstrated by the experimental data presented herein, the present inventors have found that fixability is surprisingly improved in the co-printed first and second inks when the polymeric dispersant has an acid value in the range of 100 to 170.

In a third aspect, there is provided an ink set for an inkjet printer comprising:
 a first ink comprising a first self-dispersible pigment, the first ink having a first pigment content A; and
 a second ink comprising a second pigment and a polymeric dispersant encapsulating the second pigment, the second ink having a second pigment content B,
wherein:
 the first self-dispersible pigment and the second pigment have a same color;
 the first pigment content A and the second pigment content B have a relationship $0.8 \leq A/B \leq 1.2$; and
 a polymer acid value of the polymeric dispersant is in the range of 100 to 170.

Ink sets according to the third aspect may be used advantageously in connection with the method according to the first aspect and the printer according to the second aspect.

In a fourth aspect, there is provided an aqueous-based inkjet ink comprising:
 a self-dispersible pigment;
 triethylene glycol; and
 trimethylolpropane.

In a fifth aspect, there is provided an inkjet printer comprising:
 an inkjet printhead comprising an ink channel having a respective row of nozzles; and
 an ink reservoir containing an inkjet ink in fluid communication with the ink channel, the inkjet ink comprising:
 a self-dispersible pigment;
 triethylene glycol; and
 trimethylolpropane.

Aqueous inkjet inks comprising self-dispersible pigments are well known in the art. However, it has been found that the co-solvent combination of triethylene glycol and trimethylolpropane provides surprising printhead longevity compared to alternative co-solvent systems having either of these co-solvents absent, especially when used in Memjet® printheads.

For the avoidance of doubt, the term "comprising", or variations such as "comprise" or "comprises", should be construed as including a stated element, integer or step, but not excluding any other element, integer or step.

Likewise, for the avoidance of doubt, the term "a" (or "an"), in phrases such as "comprising a", should be taken to mean "at least one" and not "one and only one". Where the term "at least one" is specifically used, this should not be construed as having any limitation on the definition of "a".

BRIEF DESCRIPTION OF THE DRAWINGS

Various embodiments of the present invention will now be described by way of example only with reference to the accompanying drawings, in which.

DETAILED DESCRIPTION OF PREFERRED AND OTHER EMBODIMENTS

Figure 1:
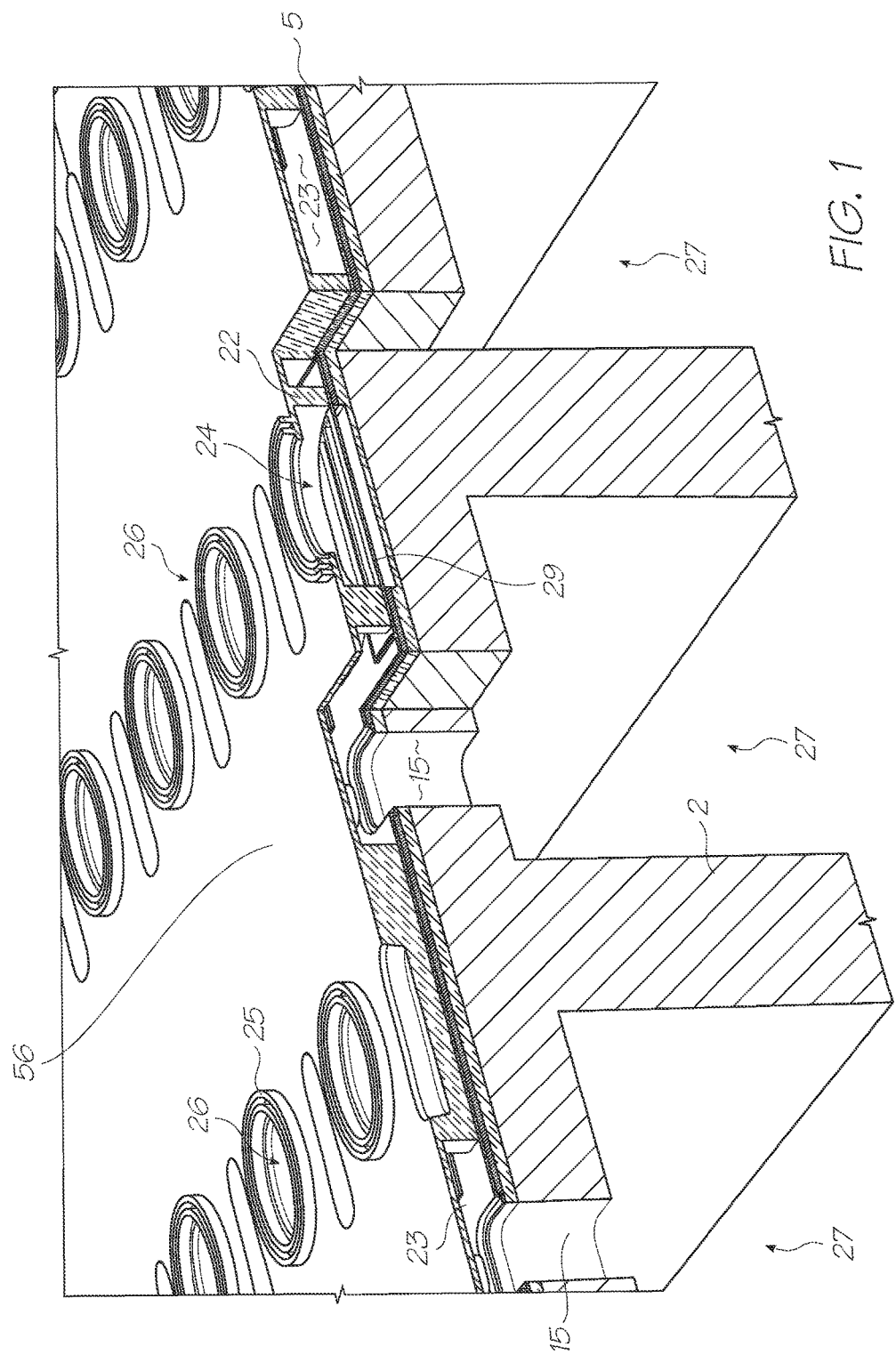
—
 FIG. 1 is a perspective view of part of a thermal inkjet printhead.

Pigments, polymeric dispersants, pigment dispersions, ink vehicles, inks, ink sets, printheads and printers employed in connection with the present invention are described below in detail.

Self-Dispersible Pigment

Some inks employed in the present invention comprise a self-dispersible (or "surface-modified") pigment. As used herein, a "self-dispersible pigment" means an inorganic or organic pigment which is dispersible in an aqueous medium without using an additional dispersant. The self-dispersible pigment typically comprises one or more hydrophilic functional groups (including anionic hydrophilic groups such as a carboxylate group and a sulfonate group, or a cationic hydrophilic group such as a quaternary ammonium group) bonded to the surface of the pigment either directly or through a linker moiety. The linker moiety may be, for example, an alkanediyl group having 1 to 12 carbon atoms, a phenylene group, or a naphthylene group.

The amount of the hydrophilic functional group is not particularly limited, but is preferably 100-3,000 μmol per 1 g of the self-dispersible pigment. When the hydrophilic functional group is a carboxylate group, 200-700 μmol per 1 g of the self-dispersible pigment is preferable.

Commercially available self-dispersible pigment dispersions include CAB-O-JET 200, CAB-O-JET 300, CAB-O-JET 352K, CAB-O-JET 250C, CAB-O-JET 260M, CAB-O-JET 270Y, CAB-O-JET 450C, CAB-O-JET465M, CAB-O-JET 470Y, and CAB-O-JET 480V (available from Cabot Corporation); BONJET CW-1 and BONJET CW-2 (available from Orient Chemical Industries Co., Ltd.); Aqua-Black 162 (available from Tokai Carbon Co., Ltd.); and SDP-100, SDP-1000, and SDP-2000 (available from Sensient Technologies Corporation).

Self-dispersible pigments may be used alone or in the form of a mixture containing two or more kinds in arbitrary proportion.

Self-dispersible pigments may be prepared via surface oxidation of conventional pigments by methods known in the art. Oxidation of conventional pigments yields surface-modified pigments having carboxyl (or carboxylate) groups directly bonded to the pigment surface.

SDP-100 is a self-dispersible carbon black pigment having surface carboxylate groups which are directly bonded to the pigment surface. Such pigments may be prepared via oxidation of carbon black, as is known in the art. SDP-100 is a particularly preferred self-dispersible pigment for use in connection with the present invention.

Conventional Pigment ("Pigment")

Some inks employed in the present invention comprise a conventional pigment (or simply "pigment"). As used herein, a "conventional pigment" or "pigment" means an inorganic or organic pigment which is not dispersible in an aqueous medium without a suitable dispersant. Examples of suitable dispersants are the polymeric dispersants described herein, which encapsulate the pigment.

Examples of inorganic pigments include carbon black and metal oxides. Carbon black is preferably used for black inks Examples of carbon black may include furnace black, thermal lamp black, acetylene black, and channel black. Examples of metal oxide pigments include Cadmium Red, Molybdenum Red, Chrome Yellow, Cadmium Yellow, Titan Yellow, chromium oxide, Viridian, Titan Cobalt Green, Ultramarine Blue, Prussian Blue and Cobalt Blue.

Examples of organic pigments include diketopyrrolopyrrole pigments, anthraquinone pigments, benzimidazolone pigments, anthrapyrimidine pigments, azo pigments, diazo pigments, phthalocyanine pigments (including naphthlocyanine pigments), uinacridone pigments, isoindolinone pigments, dioxazine pigments, indanthrene pigments, perylene pigments, perinone pigments, thioindigo pigments, quinacridone pigments, quinophthalone pigments, and metal complex pigments.

The hue of these pigments is not particularly limited and any pigments having chromatic colors such as yellow, magenta, cyan, red, blue, orange, green etc may be used.

Polymeric Dispersant

A polymeric dispersant is used for encapsulating the pigment in some inks described herein. Typically, the polymeric dispersant is mixed with the pigment to provide a pigment water dispersion, which may then be formulated into, for example, the second ink. The polymeric dispersant may be a water-soluble or a water-dispersible polymer.

Examples of the water-soluble or the water-dispersible polymer include polyester, polyurethane, and a vinyl polymer. However, vinyl polymers obtained by the addition-polymerization of a vinyl monomer are preferable from the viewpoint of improving the dispersion stability of the pigment water dispersion and the storage stability of the resulting ink.

The water-dispersible polymer is preferably a polymer formed by copolymerizing a monomer mixture (hereinafter occasionally referred to as a "monomer mixture") containing (a) a hydrophobic monomer (hereinafter occasionally referred to as "component (a)") and (b) an ionic monomer (hereinafter occasionally referred to as "component (b)") from the viewpoint of improving the dispersion stability of the pigment water dispersion and the storage stability of the resulting ink. This polymer contains constitutional units derived from the components (a) and (b), respectively.

The water-dispersible polymer preferably uses (c) a nonionic monomer (hereinafter occasionally referred to as "component (c)") as a monomer component from the viewpoint of improving the dispersion stability of the pigment water dispersion and the storage stability of the resulting ink.

The vinyl polymer is preferably formed by copolymerizing the monomer mixture containing the components (a), (b), and optionally (c) from the viewpoint of improving the dispersion stability of the pigment water dispersion and the storage stability of the resulting ink. The vinyl polymer contains constitutional units derived from the components (a), (b), and optionally (c), respectively.

The above-mentioned components (a)-(c) each may be used alone or in combination with two or more kinds Upon the production of the polymer, the contents of the above components (a)-(c) in the monomer mixture (contents of unneutralized components; hereinafter defined in the same way), specifically, the contents of the constitutional units derived from the components (a)-(c) in the polymer are as follows.

The content of the component (a) is preferably 40-85 weight %, more preferably 45-80 weight %, further more preferably 50-75 weight % from the viewpoint of improving the dispersion stability of the pigment water dispersion and the storage stability and the ejectability of the resulting ink.

The content of the component (b) is preferably 10-25 weight %, more preferably 13-23 weight %, further more preferably 15-20 weight % from the viewpoint of improving the dispersion stability of the pigment water dispersion and the storage stability and the ejectability of the resulting ink.

The content of the component (c) is preferably 0-40 weight %, more preferably 10-35 weight %, further more preferably 20-30 weight % from the viewpoint of improving the dispersion stability of the pigment water dispersion and the storage stability and the ejectability of the resulting ink.

The weight-average molecular weight of the polymer is preferably 5,000-500,000, more preferably 10,000-300,000, further more preferably 20,000-200,000, yet further more preferably 30,000-100,000 from the viewpoint of improving the dispersion stability of the pigment water dispersion and the storage stability and the ejectability of the resulting ink, as well as from the viewpoint of obtaining a printed material with high optical density, excellent abrasion resistance, and limited severe strike-through. The weight-average molecular weight can be measured by the method described in Examples.

The acid value of the polymer is generally in the range of 100 to 170, and more preferably in the range of 110 to 150 from the viewpoint of improving fixability or rub-fastness of the co-printed first and inks A polymer acid value (KOH mg/g) is the number of mg of potassium hydroxide necessary to neutralize the free acid in 1 g of the polymer. The acid value is determined based on ISO 660-1996. The acid value is determined by titration of a polymer solution in a suitable solvent such as methyl ethyl ketone.

Hydrophobic Monomer (a)

Examples of the hydrophobic monomer (a) include an aromatic group-containing monomer and an alkyl (meth) acrylate.

The aromatic group-containing monomer is preferably a vinyl monomer containing an aromatic group having 6 to 22 carbon atoms, more preferably a styrene-based monomer, an aromatic group-containing (meth)acrylate, or the like.

The styrene-based monomer is preferably styrene and 2-methyl styrene, more preferably styrene.

The aromatic group-containing (meth)acrylate is preferably benzyl (meth)acrylate and phenoxyethyl (meth)acrylate, more preferably benzyl (meth)acrylate.

From the viewpoint of improving the dispersion stability of the pigment water dispersion and the storage stability of the resulting ink, an aromatic group-containing (meth)acrylate is preferably used and also preferably combined with a styrene-based monomer.

The alkyl (meth)acrylate preferably contains an alkyl group having 1 to 22, preferably 6 to 18 carbon atoms, including, for example, methyl (meth)acrylate, ethyl (meth) acrylate, (iso)propyl (meth)acrylate, (iso- or tertiary-)butyl (meth)acrylate, (iso)amyl (meth)acrylate, cyclohexyl (meth) acrylate, 2-ethylhexyl (meth)acrylate, (iso)octyl (meth)acrylate, (iso)decyl (meth)acrylate, (iso)dodecyl (meth)acrylate, and (iso)stearyl (meth)acrylate.

The terms "(iso- or tertiary-)" and "(iso)" means that "(iso- or tertiary-)" and "(iso)" groups may be or may not be present in a compound. Without these groups, the compound has a straight chain.

As the hydrophobic monomer (a), a macromer may be used.

The macromer is a compound containing a polymerizable functional group at one terminal end, the number-average molecular weight of which is 500-100,000, preferably 1,000-10,000 from the viewpoint of improving the dispersion stability of the pigment water dispersion and the storage stability of the resulting ink. The number-average molecular weight is measured by gel permeation chromatography using chloroform containing 1 mmol/L of dodecyl dimethylamine as the solvent and using polystyrene as the standard substance.

The polymerizable functional group at the terminal end of the macromer is preferably a (meth)acryloyloxy group, more preferably a methacryloyloxy group.

The macromer is preferably an aromatic group-containing monomer-based macromer and a silicone-based macromer, more preferably an aromatic group-containing monomer-based macromer from the viewpoint of improving the dispersion stability of the pigment water dispersion and the storage stability of the resulting ink.

The aromatic group-containing monomer composing the aromatic group-containing monomer-based macromer includes the aromatic group-containing monomers as described above with respect to the hydrophobic monomer (a), which is preferably styrene and benzyl (meth)acrylate, more preferably styrene.

Specific examples of the styrene-based macromer include AS-6(S), AN-6(S) and HS-6(S) (trade names, available from Toagosei Co., Ltd.).

Examples of the silicone-based macromer include organopolysiloxanes having a polymerizable functional group at one terminal end.

Ionic Monomer (b)

The ionic monomer (b) is used as the monomer component of the water-dispersible polymer from the viewpoint of improving the dispersion stability of the pigment water dispersion and the storage stability of the resulting ink. Examples of the ionic monomer (b) include an anionic monomer and a cationic monomer, which is preferably an anionic monomer from the viewpoint of improving the dispersion stability of the pigment water dispersion, the storage stability and the ejectability of the resulting ink.

Examples of the anionic monomer include a carboxylic acid monomer, a sulfonic acid monomer, and a phosphoric acid monomer.

Examples of the carboxylic acid monomer include acrylic acid, methacrylic acid, crotonic acid, itaconic acid, maleic acid, fumaric acid, citraconic acid, and 2-methacryloyloxymethylsuccinic acid.

Examples of the sulfonic acid monomer include styrenesulfonic acid, 2-acrylamido-2-methylpropanesulfonic acid, and 3-sulfopropyl (meth)acrylate.

Examples of the phosphoric acid monomer include vinylphosphonic acid, vinyl phosphate, bis(methacryloxyethyl) phosphate, diphenyl-2-acryloyloxyethyl phosphate, and diphenyl-2-methacryloyloxyethyl phosphate.

Among the above-mentioned anionic monomers, a carboxylic acid monomer is preferable, an acrylic acid and a methacrylic acid are more preferable, and a methacrylic acid is further more preferable from the viewpoint of improving the dispersion stability of the pigment water dispersion and the storage stability of the resulting ink.

Nonionic Monomer (c)

The nonionic monomer (c) includes polyalkylene glycol (meth)acrylates such as 2-hydroxyethyl (meth)acrylate, 3-hydroxypropyl (meth)acrylate, and polypropylene glycol (n=1-30) (meth)acrylate [wherein n represents the average addition molar number of oxyalkylene group, and wherein n is hereinafter defined in the same way]; an alkoxy polyalkylene glycol (meth)acrylate such as methoxypolyethylene glycol (n=1-30) (meth)acrylate; and an aralkoxy polyalkylene glycol (meth)acrylate such as phenoxy(ethylene glycol-propylene glycol copolymer) (n=1-30 in which n of ethylene glycol is 1-29) (meth)acrylate. Among these, polypropylene glycol (n=2-30) (meth)acrylate and phenoxy(ethylene glycol-propylene glycol copolymer) (meth)acrylate are preferable, and the combination of these is more preferable.

Specific examples of commercially available components (c) include NK Ester M-20G, NK Ester M-40G, NK Ester M-90G, and NK Ester EH-4E available from Shin Nakamura Chemical Co., Ltd. and BLEMMER PE-90, BLEMMER PE-200, BLEMMER PE-350, BLEMMER PME-100, BLEMMER PME-200, BLEMMER PME-400, BLEMMER PP-500, BLEMMER PP-800, BLEMMER AP-150, BLEMMER AP-400, BLEMMER AP-550, BLEMMER 50PEP-300, BLEMMER 50POEP-800B, and BLEMMER 43PAPE-600B available from NOF Corporation. Particularly, NK Ester EH-4E is preferable from the viewpoint of the high optical density.

Preparation of Water-Dispersible Polymer

The water-dispersible polymer is prepared by copolymerizing a mixture comprising the above-mentioned hydrophobic monomer (a), ionic monomer (b), optionally nonionic monomer (c), and other monomers by a well-known polymerization method. As the polymerization method, a solution polymerization method is preferable.

The organic solvent used in the solution polymerization method is not limited in particular but is preferably methyl ethyl ketone, toluene, methyl isobutyl ketone, or the like from the viewpoint of the copolymerizability of the monomers.

The polymerization may be carried out in the presence of a polymerization initiator or a chain transfer agent. The polymerization initiator is preferably an azo compound, more preferably 2,2'-azobis(2,4-dimethylvaleronitrile).

An example of the chain transfer agent is a mercaptan, preferably 2-mercapto ethanol.

Suitable polymerization conditions of the monomer mixture vary depending upon the type of the polymerization initiator to be used and the like. The polymerization temperature is preferably from 50-90° C., more preferably 60-90° C., further more preferably 70-85° C. The polymerization time is preferably 1-20 hours, more preferably 4-15 hours, further more preferably 6-10 hours. Furthermore, the polymerization is preferably conducted in a nitrogen atmosphere or an atmosphere of an inert gas such as argon.

After polymerization, the unreacted monomers and the like can be removed from the reaction solution by reprecipitation, membrane separation, chromatography, extraction, and the like.

Pigment Water Dispersion

The pigment water dispersion containing the second pigment (e.g. carbon black) and the polymer encapsulating the second pigment can be efficiently prepared by a two-step process The first step includes dispersing a dispersion mixture comprising the polymer, an organic solvent, the second pigment, and water.

The organic solvent employed in the dispersion mixture preferably has high compatibility with the polymer but low solubility in water. Specifically, the organic solvent has a solubility in water at 20° C. of less than 40 weight %, and is preferably an aliphatic alcohol, a ketone, an ether, and an ester. From the viewpoint of improving the wettability to the pigment and the adsorbability of the polymer to the pigment, methyl ethyl ketone is usually preferred.

The weight ratio of the polymer to the organic solvent (polymer/organic solvent) is preferably 0.10-0.60, more preferably 0.20-0.50, further more preferably 0.25-0.45 from the viewpoint of improving the wettability to the pigment and the adsorbability of the polymer to the pigment.

From the viewpoint of improving the dispersion stability of the pigment water dispersion and the storage stability and the ejectability of the resulting ink, a neutralizing agent is preferably used in the dispersion mixture of the first step. When the neutralizing agent is used, the pigment water dispersion is preferably neutralized such that the pH falls within the range of from 7 to 11.

The neutralizing agent may be, for example, an alkali metal hydroxide, ammonia, and an organic amine. From the viewpoint of improving the dispersion stability of the pigment water dispersion and the storage stability and the ejectability of the resulting ink, an alkali metal hydroxide and ammonia are preferable. Sodium hydroxide is a preferred example of an alkali metal hydroxide neutralizing agent.

The neutralizing agent is preferably used in the form of the aqueous solution from the viewpoint of sufficiently promoting the neutralization. The concentration of the aqueous neutralizing agent is preferably 3-30 weight %, more preferably 10-25 weight %, further more preferably 15-25 weight % from the viewpoint of sufficiently promoting the neutralization.

The weight ratio of the aqueous neutralizing agent to the organic solvent (aqueous neutralizing agent/organic solvent) is preferably 0.010-0.10, more preferably 0.020-0.060, further more preferably 0.025-0.050 from the viewpoint of promoting the adherability of the polymer to the pigment and the neutralization of the polymer to improve the dispersibility of the pigment particles and from the viewpoint of decreasing the coarse particles due to the improved dispersibility to improve the ejectability of the resulting ink.

The neutralizing agent and the aqueous neutralizing agent each may be used alone or in combination with two or more kinds The degree of neutralization of the polymer is preferably 60-400 mol %, more preferably 80-200 mol %, further more preferably 100-150 mol % from the viewpoint of improving the dispersion stability of the pigment water dispersion and the storage stability and the ejectability of the resulting ink.

The degree of neutralization herein means the value obtained by dividing the molar equivalent of the neutralizing agent by the molar amount of the anionic group of the polymer. The anionic group includes the carboxylic acid group of the ionic monomer.

The content of the second pigment in the dispersion mixture is preferably 5-30 weight %, more preferably 8-25 weight %, further more preferably 10-20 weight % in the mixture from the viewpoint of improving the dispersion stability of the pigment water dispersion, the storage stability and the ejectability of the resulting ink, and the productivity of the pigment water dispersion.

The content of the polymer in the dispersion mixture is preferably 1.5-15 weight %, more preferably 2.0-10 weight %, further more preferably 2.5-7.0 weight % in the mixture from the viewpoint of improving the dispersion stability of the pigment water dispersion and the storage stability and the ejectability of the resulting ink.

The content of the organic solvent in the dispersion mixture is preferably 10-30 weight %, more preferably 13-25 weight %, further more preferably 15-20 weight % in the mixture from the viewpoint of improving the wettability to the pigment and the adsorbability of the polymer to the pigment.

The content of the water in the dispersion mixture is preferably 50-80 weight %, more preferably 60-75 weight %, further more preferably 65-75 weight % in the mixture from the viewpoint of improving the dispersion stability of the pigment water dispersion and the productivity of the pigment water dispersion.

The weight ratio of the pigment to the amount of the polymer (pigment/polymer) in the dispersion mixture is preferably 80/20-50/50, more preferably 75/25-60/40, further more preferably 70/30-65/45 from the viewpoint of obtaining a printed material with excellent abrasion resistance and limited severe strike-through and from the viewpoint of improving the dispersion stability of the pigment water dispersion and the storage stability and the ejectability of the resulting ink.

After the first step, a dispersed material is obtained from the dispersion mixture. The dispersion method for obtaining the dispersed material is not particularly limited. The pigment particles may be finely atomized by only a single dispersion process until a desired average particle size is achieved. Alternatively, after a preliminary dispersion process, the mixture may be subjected to a secondary dispersion process under shear stress so as to control the average particle size of the pigment particles to a desired value.

The temperature for the preliminary dispersion process of the first step is preferably 0-40° C., more preferably 0-20° C., further more preferably 0-10° C. The dispersing time is preferably 1-30 hours, more preferably 2-10 hours, further more preferably 2-5 hours.

Conventional stirring mixers, such as an anchor blade and a disper blade are preferably used for the preliminary dispersion process. In particular, a high-speed stirring mixer is preferably used.

The secondary dispersion process applying shear stress to the mixture may employ, for example, kneading machines such as roll mills and kneaders, a high-pressure homogenizer such as Micro Fluidizer (trade name, available from Microfluidics Inc.), and media dispersers such as a paint shaker and a beads mill. Commercially available media dispersers include Ultra Apex Mill (trade name, available from Kotobuki Industries Co., Ltd.) and Pico Mill (trade name, available from Asada Iron Works Co., Ltd.). These dispersers may also be used in combination with two or more kinds Among these dispersers, the high-pressure homogenizer is preferably used from the viewpoint of reducing the particle size of the pigment.

When a high-pressure homogenizer is used, the pigment may have a desired particle size by controlling the process pressure and the number of passing times.

The process pressure is preferably 60-250 MPa, more preferably 100-200 MPa, further more preferably 150-180 MPa. The number of passing times is preferably 3-30, more preferably 10-25, further more preferably 15-20.

In the second step the organic solvent is removed from the dispersed material from the first step so as to obtain a pigment water dispersion. Removal of the organic solvent may be by any suitable method known in the art. From the viewpoint of suppressing the generation of aggregates and from the viewpoint of improving the dispersion stability of the pigment water dispersion and the storage stability and the ejectability of the resulting ink, water is added in the dispersed material to adjust the weight ratio of the organic solvent to water (organic solvent/water) to preferably 0.15-0.40, more preferably 0.20-0.30, before the organic solvent is removed.

The concentration of the non-volatile component (solid content concentration) of the pigment water dispersion after the weight ratio of the organic solvent to water has been adjusted is preferably 5-30 weight %, more preferably 10-20 weight %, further more preferably 15-18 weight % from the viewpoint of suppressing the generation of aggregates during removal of the organic solvent and from the viewpoint of improving the productivity of the pigment water dispersion. Some of the water contained in the pigment water dispersion may be removed simultaneously together with the organic solvent.

The device for removing the organic solvent used in this step includes, for example, a simple batch distillation device, a reduced pressure distillation device, a membrane distillation device such as a flash evaporator, a rotary distillation device, and a stirring distillation device. From the viewpoint of effectively removing the organic solvent, a rotary distillation device and a stirring distillation device are preferable, a rotary distillation device is more preferable, and a rotary evaporator is further more preferable.

The temperature of the dispersed material when the organic solvent is removed can optionally be selected depending on the type of the organic solvent used but is preferably 40-80° C., more preferably 40-70° C., further more preferably 40-65° C. under reduced pressure. The process pressure at this time is preferably 0.01-0.5 MPa, more preferably 0.02-0.2 MPa, further more preferably 0.05-0.1 MPa. The removing time is preferably 1-24 hours, more preferably 2-12 hours, further more preferably 5-10 hours.

The organic solvent is preferably substantially removed from the obtained pigment water dispersion. However, the residual organic solvent may be present. The amount of the residual organic solvent is preferably 0.1% by weight or less, more preferably 0.01% by weight or less.

The concentration (solid content concentration) of the non-volatile component of the obtained pigment water dispersion is preferably 10-30 weight %, more preferably 15-25 weight %, further more preferably 18-22 weight % from the viewpoint of improving the dispersion stability of the pigment water dispersion and from the viewpoint of easy preparation of the resulting ink.

In the obtained pigment water dispersion, the solid component composed of the pigment and the polymer is dispersed in water as the main solvent.

The average particle size of the pigment particles in the pigment water dispersion is preferably 40-200 nm, more preferably 50-150 nm, further more preferably 60-130 from the viewpoint of improving the dispersion stability of the pigment water dispersion and the storage stability and the ejectability of the resulting ink and from the viewpoint of obtaining a printed material with high optical density, excellent abrasion resistance, and limited severe strike-through. The average particle size can be measured by the method described in Examples below.

Ink Vehicles

Ink vehicles for formulating inkjet inks will be well known to the person skilled in the art. The ink vehicles used in the present invention are generally aqueous ink vehicles comprising at least 40 wt % water, at least 50 wt % water or at least 60 wt % water. Usually, the amount of water present in the inkjet ink is in the range of 50 wt % to 90 wt %, or optionally in the range of 60 wt % to 80 wt %.

In addition to water, the aqueous ink vehicle may comprise other components, such as co-solvents (including humectants, penetrants, wetting agents etc.), surfactants, biocides, sequestering agents, pH adjusters, viscosity modifiers, etc.

Co-solvents are typically water-soluble organic solvents. Suitable water-soluble organic solvents include $C_{1-4}$ alkyl alcohols, such as ethanol, methanol, butanol, propanol, and 2-propanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane; or combinations thereof.

Other useful water-soluble organic solvents, which may be used as co-solvents, include polar solvents, such as 2-pyrrolidone, N-methylpyrrolidone, ϵ-caprolactam, dimethyl sulfoxide, sulfolane, morpholine, N-ethylmorpholine, 1,3-dimethyl-2-imidazolidinone and combinations thereof.

The inkjet ink may contain a high-boiling water-soluble organic solvent as a co-solvent, which can serve as a wetting agent or humectant for imparting water retentivity and wetting properties to the ink composition. Such a high-boiling water-soluble organic solvent includes one having a boiling point of 180° C. or higher. Examples of the water-soluble organic solvent having a boiling point of 180° C. or higher are ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol ("glycerine"), trimethylolpropane, erythritol, pentaerythritol and combinations thereof Other suitable wetting agents or humectants include saccharides (including monosaccharides, oligosaccharides and polysaccharides) and derivatives thereof (e.g. maltitol, sorbitol, xylitol, hyaluronic salts, aldonic acids, uronic acids etc.)

The inkjet ink may also contain a penetrant, as one of the co-solvents, for accelerating penetration of the aqueous ink into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol monot-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of suitable 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol. Glycerol may also be used as a penetrant.

Typically, the amount of co-solvent present in the ink is in the range of about 5 wt % to 50 wt %, or optionally 10 wt % to 40 wt %.

The inkjet ink may also contain one or more surface active agents ("surfactant"), such as an anionic surface active agent, a zwitterionic surface active agent, a nonionic surface active agent or mixtures thereof. Useful anionic surface active agents include sulfonic acid types, such as alkanesulfonic acid salts, α-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Specific examples of the anionic surface active agents are sodium dodecylbenzenesulfonate, sodium laurate, and a polyoxyethylene alkyl ether sulfate ammonium salt.

Examples of zwitterionic surface active agents include N,N-dimethyl-N-octyl amine oxide, N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide and N,N-dimethyl-N-(Z-9-octadecenyl)-N-amine oxide.

Examples of nonionic surface active agents include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides. Specific examples of nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g. polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesquioleate, polyoxyethylene mono-oleate, and polyoxyethylene stearate.

Acetylene glycol surface active agents, such as 2,4,7,9-tetramethyl-5-decyne-4,7-diol; ethoxylated 2,4,7,9-tetramethyl-5-decyne-4,7-diol; 3,6-dimethyl-4-octyne-3,6-diol or 3,5-dimethyl-1-hexyn-3-ol, may also be used. Specific examples of nonionic surfactants, which may be used in the present invention, are Surfynol® surfactants (available from Air Products and Chemicals, Inc), such as Surfynol® 465 and Surfynol® 440; and Olfine® surfactants (available from Nissin Chemical Industry Co Ltd.), such as Olfine® E100 and Olfine® E1010.

The surfactant(s) are typically present in the aqueous inkjet ink in an amount ranging from 0.05 wt % to 2 wt %.

The aqueous inkjet ink may also include a pH adjuster or buffer, such as sodium hydroxide, potassium hydroxide, lithium hydroxide, sodium carbonate, sodium hydrogencarbonate, potassium carbonate, potassium hydrogencarbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate; ammonia; and amines, such as methylamine, ethylamine, diethylamine, trimethylamine, triethylamine, tris(hydroxymethyl)aminomethane hydrochloride, triethanolamine, diethanolamine, diethylethanolamine, triisopropanolamine, butyldiethanolamine, morpholine, propanolamine, 4-morpholineethanesulfonic acid and 4-morpholinepropanesulfonic acid ("MOPS"). The amount of pH adjuster, when present, is typically in the range of from 0.01 to 2 wt. % or 0.05 to 1 wt. %.

The aqueous inkjet ink may also include a biocide, such as benzoic acid, dichlorophene, hexachlorophene, sorbic acid, hydroxybenzoic esters, sodium dehydroacetate, 1,2-benthiazolin-3-one ("Proxel® GXL", available from Arch Chemicals, Inc.), 3,4-isothiazolin-3-one or 4,4-dimethyloxazolidine. The amount of biocide, when present, is typically in the range of from 0.01 to 2 wt. % or 0.05 to 1 wt. %.

The aqueous inkjet ink may also contain a sequestering agent, such as ethylenediaminetetraacetic acid (EDTA).

A preferred ink vehicle for the first and second inks employed in the present invention comprises 1 to 15 wt. % triethyleneglycol, more preferably 2 to 10 wt. % triethyleneglycol, and more preferably 3 to 7 wt. % triethyleneglycol from the viewpoint of increasing printhead lifetime.

Preferably, the ink vehicle further comprises from 2 to 15 wt. % trimethylolpropane, more preferably 5 to 10 wt. % trimethylolpropane from the viewpoint of further increasing printhead lifetime.

Preferably, a ratio of trimethylolpropane to triethyleneglycol in the ink vehicle is in range of 1:1 to 1:3, more preferably 1:1.2 to 1:2. Preferably an amount of trimethylolpropane is greater than an amount of triethyleneglycol in the ink vehicle for optimizing printhead lifetime.

Preferably, the ink vehicle comprises from 1 to 20 wt. % glycerol, more preferably 2 to 10 wt. % glycerol, from the viewpoint of providing optimal humectancy and viscosity.

Preferably, the ink vehicle comprises from 0.05 to 2 wt. % of a nonionic surfactant, more preferably 0.1 to 1 wt. % of a nonionic surfactant from the viewpoint of providing optimal surface tension. Acetylenic nonionic surfactants are particularly preferred.

Inks Comprising Self-Dispersible Pigment ("First Ink")

Aqueous-based first inks comprising a self-dispersible pigment may be prepared by mixing the self-dispersible pigment in a suitable ink vehicle, as described above.

Preferred self-dispersible pigments are those having hydrophilic groups (e.g. carboxylate) groups directly bonded to the pigment surface from the viewpoint of optimizing optical density. For example, oxidized carbon black (commercially available as SDP-100, Sensient Technologies Corporation) provides superior black optical density compared to carbon blacks having hydrophilic groups bonded to the pigment surface via a linker groups when employed in the present invention. However, self-dispersible pigments having directly bonded hydrophilic groups are generally inferior to self-dispersible pigments having linker moieties from the viewpoint of printhead lifetime. In particular, it is understood that the SDP-100 causes failure of resistive heater elements, particularly uncoated resistive heater elements, via a kogative and/or corrosive failure mechanism.

Surprisingly, it has been found that the use of certain co-solvents mitigates the deleterious effects of self-dispersible pigments having directly bonded hydrophilic groups. In particular, when the ink comprising the self-dispersible pigment comprises triethyleneglycol and/or trimethylolpropane, the printhead lifetime is improved. Especially, when the ink comprising the self-dispersible pigment comprises triethyleneglycol and trimethylolpropane, the printhead lifetime is significantly improved. Preferred amounts and ratios of triethyleneglycol and trimethylolpropane in the ink vehicle for the first ink are described above.

The amount of self-dispersible pigment in the first ink (referred to as "pigment content A") is preferably 1-10 weight %, more preferably 2-7 weight %, more preferably, 3.5-6.5 weight %, further more preferably 4-6% weight %, yet further more preferably 4.5-5.5% weight % in the water-based ink from the viewpoint of improving the storage stability and the ejectability of the resulting ink and from the viewpoint of obtaining a printed material with high optical density, excellent abrasion resistance, and limited severe strike-through.

The first ink employed in the present invention is preferably different than the second ink described below. Typically, the first ink is absent any polymeric dispersant and/or conventional pigment.

The static surface tension at 20° C. of the first ink is preferably 28-42 mN/m, more preferably 30-40 mN/m, furthermore preferably 32-38 mN/m from the viewpoint of improving the ejectability of the ink and from the viewpoint of obtaining a printed material with excellent abrasion resistance and limited severe strike-through.

The viscosity at 35° C. of the first ink is preferably 1.5-4 mPa·s, more preferably 1.8-3 mPa·s, furthermore preferably 2-2.5 mPa·s from the viewpoint of improving the ejectability of the resulting ink and from the viewpoint of obtaining a printed material with excellent abrasion resistance and limited severe strike-through.

Inks Comprising Pigment and Polymeric Dispersant ("Second Ink")

Aqueous-based second inks comprising a pigment and a polymeric dispersant may be prepared by mixing the pigment water dispersion, as described above, in a suitable ink vehicle, as described above.

Preferably, the ink vehicle for the second ink comprises the same co-solvents as the first ink comprising the self-dispersible polymer. Preferably, the ink vehicle for the second ink is the same as or similar to the ink vehicle employed in the first ink from the viewpoint of consistent droplet size, droplet ejection velocity and nozzle chamber refill rates. In other words, the ink vehicle for the second ink preferably comprises triethylene glycol and trimethylolpropane as described above.

The ink vehicles for the first and second inks preferably further comprise 2 to 10 wt. % glycerol; and 0.05 to 2 wt. % of a nonionic acetylenic surfactant.

The second ink employed in the present invention is preferably different than the first ink. Typically, the second ink is absent any self-dispersible pigment.

The static surface tension at 20° C. of the second ink is preferably 28-42 mN/m, more preferably 30-40 mN/m, furthermore preferably 32-38 mN/m from the viewpoint of improving the ejectability of the ink and from the viewpoint of obtaining a printed material with excellent abrasion resistance and limited severe strike-through.

The viscosity at 35° C. of the second ink is preferably 1.5-4 mPa·s, more preferably 1.8-3 mPa·s, furthermore preferably 2-2.5 mPa·s from the viewpoint of improving the ejectability of the resulting ink and from the viewpoint of obtaining a printed material with excellent abrasion resistance and limited severe strike-through.

The amount of pigment in the second ink (referred to as "pigment content B") is preferably 1-10 weight %, more preferably 2-7 weight %, more preferably, 3.5-6.5 weight %, further more preferably 4-6% weight %, yet further more preferably 4.5-5.5% weight % in the water-based ink from the viewpoint of improving the storage stability and the ejectability of the resulting ink and from the viewpoint of obtaining a printed material with high optical density, excellent abrasion resistance, and limited severe strike-through.

The amount of polymeric dispersant ("polymer") in the second ink is preferably 1-10 weight %, more preferably 1.25-3.4 weight %, further more preferably 1.67-2.5 weight from the viewpoint of improving the storage stability and the ejectability of the ink and from the viewpoint of obtaining a printed material with high optical density, excellent abrasion resistance, and limited severe strike-through.

Ink Sets Comprising First and Second Inks

Ink sets employed in connection with the present invention typically comprise the first and second inks, and optionally comprise other inks. For example, the ink set may comprise a first black ink and a second black ink, as well as one or more other inks selected from the group consisting of: cyan, magenta, yellow, red, green, blue and spot color(s) (e.g. orange, khaki, metallic etc.) inks Preferably, the other inks in the ink set are cyan, magenta and yellow inks Preferably, the other inks in the ink set are aqueous pigment-based inks The ratio A/B of the pigment content A of the first ink to the pigment content B of the second is preferably in range of 0.8 to 1.2, more preferably 0.9 to 1.1, further more preferably 0.95 to 1.05 from the viewpoint of improving the ink fixability on paper and optical density of the printed inks The difference between the pigment content A of the first ink and the pigment content B of the second ink, which is A-B (for A>B) or B-A (for B>A), is preferably 2 wt. % or less, more preferably 1 wt %. or less, further more preferably 0.5 wt. % or less from the viewpoint of improving the ink fixability on a paper the optical density of the printed inks The difference C-D (for C>D) or D-C(for D>C) between the surface tension C of the first ink and the surface tension D of the second ink is preferably 3 mN/m or less, more preferably 2 mN/m or less, further more preferably 1 mN/m or less from the viewpoint of minimizing the movement of the undercoat ink caused by the difference surface tensions and from the viewpoint of maintaining consistent drop ejection velocities, drop ejection velocities and chamber refill rates in the printhead. Maintaining consistently high chamber refill rates is particularly important in high-speed inkjet printing and may be a limiting factor for the maximum drop ejection frequency of each nozzle device. It is therefore preferable that the first ink and the second ink have about equal surface tensions so that nozzle chambers in different ink channels of the printhead are refilled at the same or similar rates, and so that nozzle devices in different ink channels can eject droplets at the same or similar frequencies.

The difference E-F (for E>F) or F-E (for F>E) between the viscosity E of the first ink and the viscosity F of the second ink is preferably 0.5 mPa·s or less, more preferably 0.3 mPa·s or less, further more preferably 0.2 mPa·s or less from the viewpoint of maintaining consistent drop ejection velocities and drop ejection frequencies in different ink channels of the printhead.

As described above, the first and second inks preferably employ the same or similar ink vehicles in order to fulfil the preferred surface tension and viscosity parameters of the ink set.

Inkjet Printheads

The inks according to the present invention are primarily for use in connection with thermal inkjet printheads, although they may be used in other types of printhead, especially those where a resistive heater element contacts the ink. For the sake of completeness, there now follows a brief description of one of the Applicant's thermal inkjet printheads, as described in U.S. Pat. No. 7,303,930, the contents of which is herein incorporated by reference.

Figure 2:
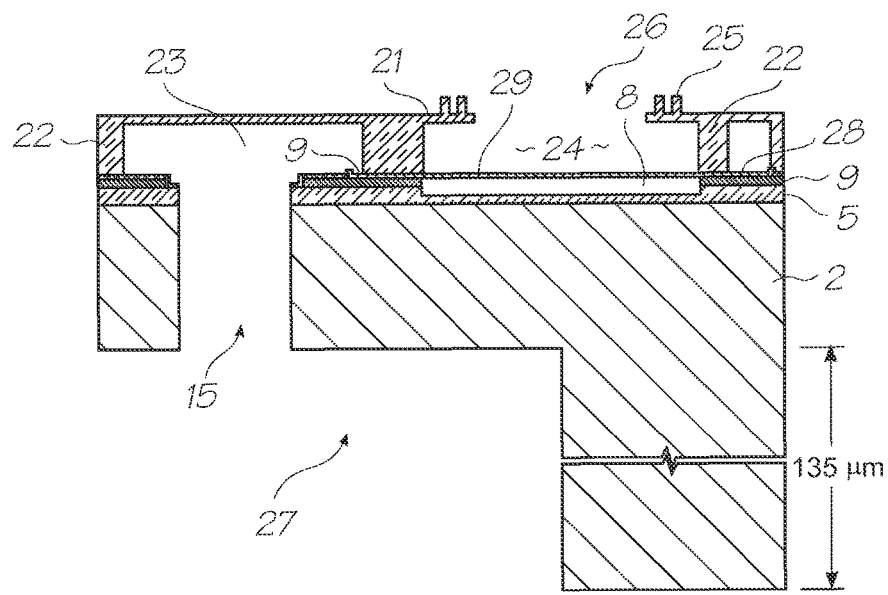
FIG. 2 is a side view of one of the nozzle assemblies shown in FIG. 1.
Figure 3:
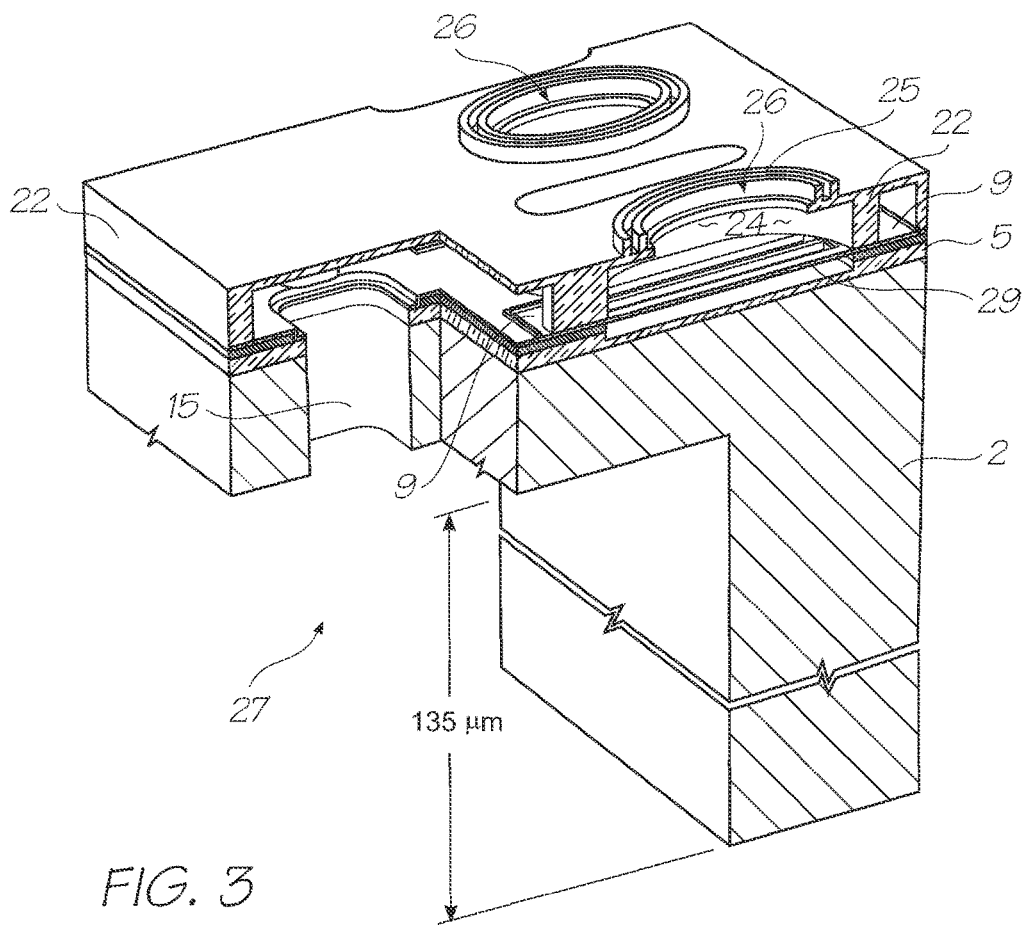
FIG. 3 is a perspective of the nozzle assembly shown in FIG. 2.

Referring to FIG. 1, there is shown part of a printhead comprising a plurality of nozzle assemblies. FIGS. 2 and 3 show one of these nozzle assemblies in side-section and cutaway perspective views.

Each nozzle assembly comprises a nozzle chamber 24 formed by MEMS fabrication techniques on a silicon wafer substrate 2. The nozzle chamber 24 is defined by a roof 21 and sidewalls 22 which extend from the roof 21 to the silicon substrate 2. As shown in FIG. 1, each roof is defined by part of a nozzle plate 56, which spans across an ejection face of the printhead. The nozzle plate 56 and sidewalls 22 are formed of the same material, which is deposited by PECVD over a sacrificial scaffold of photoresist during MEMS fabrication. Typically, the nozzle plate 56 and sidewalls 22 are formed of a ceramic material, such as silicon dioxide or silicon nitride. These hard materials have excellent properties for printhead robustness, and their inherently hydrophilic nature is advantageous for supplying ink to the nozzle chambers 24 by capillary action.

Returning to the details of the nozzle chamber 24, it will be seen that a nozzle opening 26 is defined in a roof of each nozzle chamber 24. Each nozzle opening 26 is generally elliptical and has an associated nozzle rim 25. The nozzle rim 25 assists with drop directionality during printing as well as reducing, at least to some extent, ink flooding from the nozzle opening 26. The actuator for ejecting ink from the nozzle chamber 24 is a heater element 29 positioned beneath the nozzle opening 26 and suspended across a pit 8. Current is supplied to the ends 28 of the heater element 29 via electrodes 9 connected to drive circuitry in underlying CMOS layers 5 of the substrate 2. When a current is passed through the heater element 29, it rapidly superheats surrounding ink to form a gas bubble, which forces ink through the nozzle opening 26. By suspending the heater element 29, it is completely immersed in ink when the nozzle chamber 24 is primed. This improves printhead efficiency, because less heat dissipates into the underlying substrate 2 and more input energy is used to generate a bubble.

Typically, the heater element is comprised of a material, which is uncoated and directly exposed to ink in the nozzle chamber 24. The heater material may be a metal or a conductive ceramic material. Examples of suitable heater materials include titanium nitride; titanium alloys; and nitrides of titanium alloy. Specific examples of suitable heater materials are titanium aluminium nitride and titanium-aluminium alloy.

As seen most clearly in FIG. 1, the nozzles are arranged in rows and an ink supply channel 27 extending longitudinally along the row supplies ink to each nozzle in the row. The ink supply channel 27 delivers ink to an ink inlet passage 15 for each nozzle, which supplies ink from the side of the nozzle opening 26 via an ink conduit 23 in the nozzle chamber 24.

As shown in FIG. 1, each color channel (or "ink channel") in the printhead has only one nozzle row. However, in a typical Memjet® printhead, each color channel contains a pair of offset nozzle rows, whereby both nozzle rows in the pair receive ink from a common ink supply channel 27 and ink reservoir.

A MEMS fabrication process for manufacturing such printheads is described in detail in U.S. Pat. No. 7,303,930, the contents of which are herein incorporated by reference.

The operation of printheads having suspended heater elements is described in detail in the Applicant's U.S. Pat. No. 7,278,717, the contents of which are incorporated herein by reference.

The Applicant has also described thermal bubble-forming inkjet printheads having embedded heater elements. Such printheads are described in, for example, U.S. Pat. No. 7,246,876 and US 2006/0250453, the contents of which are herein incorporated by reference.

The inkjet inks of the present invention function optimally in combination with the Applicant's thermal inkjet printheads, as described above. However, their use is not necessarily limited to the Applicant's thermal printheads. The inks described herein may be used in other types of thermal bubble-forming inkjet printheads, piezoelectric printheads, thermal-bend actuated printheads (as described in, for example, U.S. Pat. Nos. 7,926,915; 7,669,967; and 2011/0050806, the contents of which are incorporated herein by reference) etc.

For the sake of completeness, inkjet printers incorporating the Applicant's thermal inkjet printheads are described in, for example, U.S. Pat. Nos. 7,201,468; 7,360,861; 7,380,910; 7,357,496; 8,425,020; 8,562,104; and 8,529,014 the contents of each of which are herein incorporated by reference.

Figure 4:
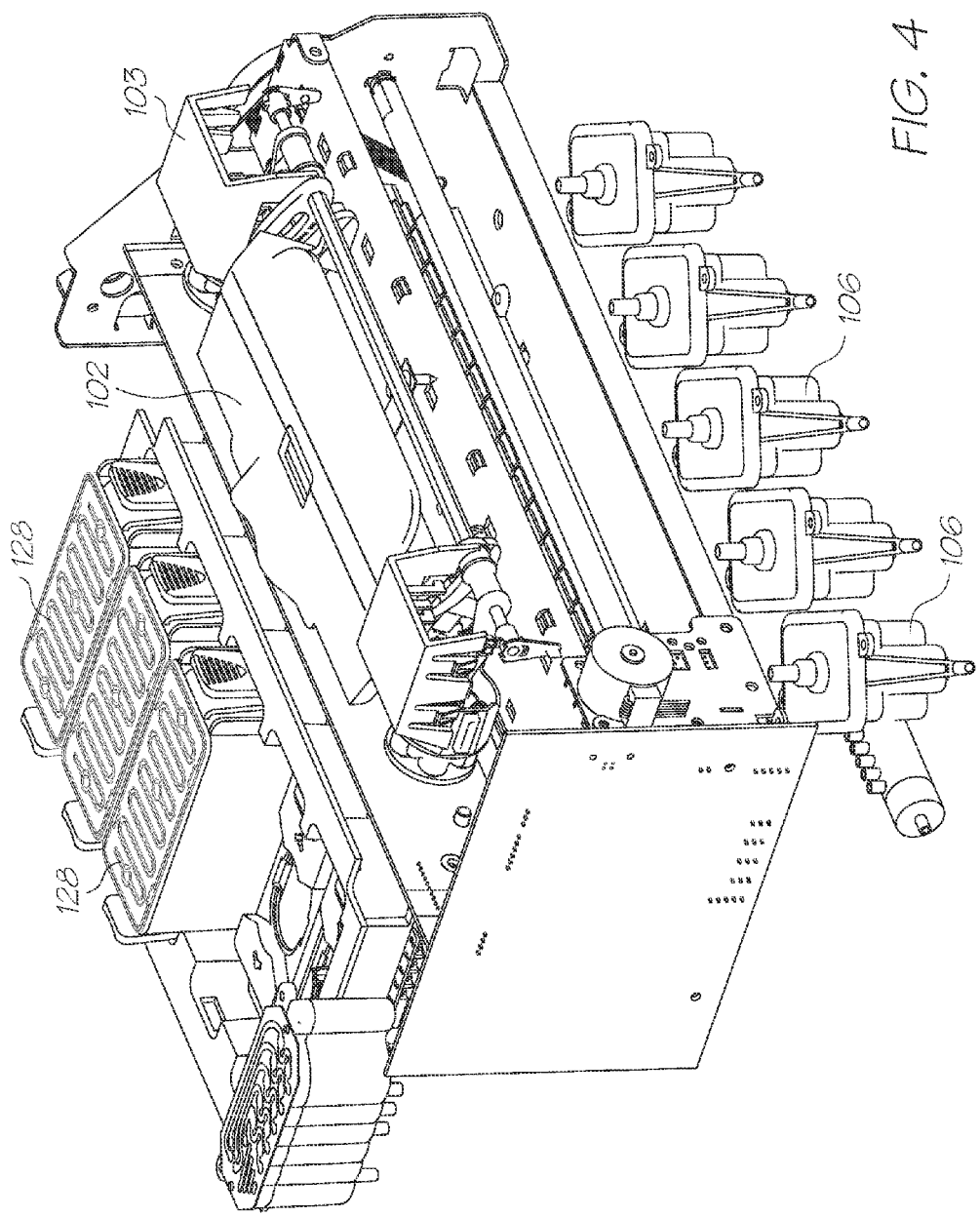
FIG. 4 is perspective view of a thermal inkjet print engine.

FIG. 4 shows a print engine 103 for a thermal inkjet printer, as described in the Applicant's U.S. Pat. No. 8,066,359, the contents of which is herein incorporated by reference. The print engine 103 includes a removable print cartridge 102, comprising a pagewidth printhead, and a bank of user-replaceable ink cartridges 128. Each ink channel (or "color channel") typically has its own ink reservoir 128 and a corresponding pressure-regulating chamber 106 for regulation of a hydrostatic pressure of ink supplied to the printhead. Hence, the print engine 103 has five ink reservoirs 128 and five corresponding pressure-regulating chambers 106.

Each ink cartridge 128 may comprise an ink composition as described herein. Although fluidic connections between the various components are not shown in FIG. 4, it will be appreciated that these connections are made with suitable hoses in accordance with the fluidics system described in, for example, U.S. Pat. No. 8,066,359, the contents of which are incorporated herein by reference.

Typically, the ink channels employed in the five-channel print engine 103 are $CMYK_1K_2$. The ink channel order may be arranged so as to optimize preferred ink color mixing effects at the nozzle plate of the printhead, as described in US2013/0070024, the contents of which are herein incorporated by reference. For example, an ink channel order of $YK_1CK_2M$ may be employed where yellow (Y) is positioned furthest upstream and magenta (M) is positioned furthest downstream. In accordance with the second aspect, the first black ink ($K_1$) is positioned upstream of the second black ink ($K_2$) in a multi-color printhead having two black channels. In a monochrome black printhead, an ink channel order of $K_1K_1K_2K_2K_2$ or $K_1K_1K_1K_2K_2$ may be employed in accordance with the second aspect. These and other ink channel configurations will be readily apparent to the person skilled in the art.

Typically, neighboring ink planes in a Memjet® printhead are spaced apart from each other by a distance in the range of about 20 to 1000 microns, or 30 to 500 microns or 50 to 100 microns.

Preferably, each nozzle of the printhead fires at a frequency of greater than 0.5 Hz (e.g. 1 to 20 Hz). Hence, the second ink is preferably printed over the first ink within a period of less than 10 milliseconds, and preferably within a period of 1 to 5 ms.

Typically, the Memjet® printhead is configured to eject ink droplets having a droplet weight in the range of 1 ng to 5 ng per droplet (e.g. 1 ng to 2 ng). Preferably, a difference in droplet weights between the first ink and the second ink is less than 0.3 ng per droplet. Preferably, a difference in droplet weights across all ink channels is less than 0.3 ng per droplet.

EXAMPLES

In the following Production Examples, Preparation Examples, Examples, and Comparative Examples, the terms "part(s)" and "%" represent "part(s) by weight" and "% by weight", respectively, unless otherwise stated.

The weight-average molecular weight of the polymer, the solid content concentrations of the polymer water dispersion and the pigment water dispersion, the surface tension of the water-based ink, and the average particle size of the pigment particles in the pigment water dispersion were measured as follows.

(1) Measurement of Weight-Average Molecular Weight of Polymer

The weight-average molecular weight of the polymer was measured by gel permeation chromatography (GPC device (HLC-8120GPC), available from Tosoh Corp., column (TSK-GEL, α-M×2), available from Tosoh Corp.; flow speed: 1 mL/min) using N,N-dimethylformamide in which 60 mmol/L of phosphoric acid and 50 mmol/L of lithium bromide are dissolved as the eluent and using a polystyrene as the standard substance.

(2) Measurement of Solid Content Concentration of Polymer Water Dispersion and Pigment Water Dispersion Sodium sulfate 10.0 g, which previously reached a constant weight in a desiccator, was weighed in a 30 ml polypropylene container (φ=40 mm, height=30 mm). In the container, about 1.0 g of the sample was added and mixed. The mixture was accurately weighed. The temperature of the mixture was maintained at 105° C. for 2 hours to remove the volatile component. The mixture was left in the desiccator for 15 minutes and then weighed. The weight of the sample after the volatile component was removed was divided by the weight of the added sample to determine the solid content concentration.

(3) Surface Tension of Water-based Ink

Using a surface tension meter (trade name: CBVP-Z, available from Kyowa Interface Science Co., Ltd.), a platinum plate was immersed in 5 g of the water-based ink in a cylindrical polyethylene container (diameter: 3.6 cm×depth: 1.2 cm) to measure the static surface tension of the water-based ink at 20° C.

(4) Average Particle Size of Pigment Particles in Pigment Water Dispersion

The pigment water dispersion was diluted with ion-exchanged water, which was previously filtered with a 0.2 μm filter, and the particle size was measured at 25° C. with a laser particle size analysis system "ELS-6100" available from OTSUKA ELECTRONICS CO., LTD.

Preparation Example 1

Preparation of Polymers 1-5

In a reaction vessel equipped with two dropping funnels 1 and 2, the monomers, the solvent, the polymerization initiator, and the chain transfer agent, which are shown in "Initial charge monomer solution" of Table 1, were added and mixed. The reaction vessel was purged with nitrogen gas to obtain an initial charge monomer solution.

On the other hand, the monomers, the solvent, the polymerization initiator, and the chain transfer agent, which are shown in "Dropwise addition monomer solution 1" and "Dropwise addition monomer solution 2" of Table 1, were mixed to obtain the dropwise addition monomer solutions 1 and 2. The dropwise addition monomer solutions 1 and 2 were added in the dropping funnels 1 and 2, respectively, and then the reaction vessel was purged with nitrogen gas.

While the initial charge monomer solution in the reaction vessel was stirred under a nitrogen atmosphere, the temperature of the solution was maintained 75° C. The dropwise addition monomer solution 1 in the dropping funnel 1 was gradually added dropwise in the reaction vessel for 3 hours, and then the dropwise addition monomer solution 2 in the dropping funnel 2 was gradually added dropwise in the reaction vessel for 2 hours. After the dropwise addition, the mixed solution in the reaction vessel was stirred at 75° C. for 2 hours. Subsequently, a polymerization initiator solution in which 1.5 parts of the polymerization initiator (V-65, available from Wako Pure Chemical Industries, Ltd.) is dissolved in 10 parts of MEK was prepared and added in the mixed solution to obtain a reaction solution. The reaction solution was aged with being stirred at 75° C. for 1 hour. The preparation and the addition of the polymerization initiator solution and the aging of the reaction solution were repeated twice. Subsequently, the reaction solution in the reaction vessel was maintained at 85° C. for 2 hours to obtain the polymer solution 1. Part of the obtained polymer was dried to measure the molecular weight. The weight-average molecular weight was 80,000.

The solid content of each polymer was measured and diluted with methyl ethyl ketone (MEK) to adjust the solid content concentration to 50%.

All amounts in Table 1 are recorded in parts by weight.

TABLE 1

| | | Polymer 1 | | | Polymer 2 | | |
|---|---|---|---|---|---|---|---|
| | | Initial charge monomer solution | Dropwise addition monomer solution 1 | Dropwise addition monomer solution 2 | Initial charge monomer solution | Dropwise addition monomer solution 1 | Dropwise addition monomer solution 2 |
| Monomer | (a) Methacrylic acid | 0 | 320 | 80 | 0 | 192 | 48 |
| | (b) NK Ester EH-4E[1] | 60 | 480 | 60 | 76 | 608 | 76 |

TABLE 1-continued

|  |  |  |  |  |  |  |  |
|---|---|---|---|---|---|---|---|
|  | (c) Benzyl acrylate | 80 | 640 | 80 | 80 | 640 | 80 |
|  | (d) Styrene macromer | 40 | 360 | 0 | 40 | 360 | 0 |
| Solvent | MEK | 0 | 1200 | 490 | 0 | 1200 | 490 |
| Polymerization initiator | V-65[2] | 0 | 16 | 4 | 0 | 16 | 4 |
| Chain transfer agent | 2-Mercapto ethanol | 0.6 | 4.2 | 1.2 | 0.6 | 4.2 | 1.2 |

|  |  | Polymer 3 | | | Polymer 4 | | |
|---|---|---|---|---|---|---|---|
|  |  | Initial charge monomer solution | Dropwise addition monomer solution 1 | Initial charge monomer solution | Dropwise addition monomer solution 1 | Initial charge monomer solution | Dropwise addition monomer solution 1 |
| Monomer | (a) Methacrylic acid | 0 | 240 | 0 | 240 | 0 | 240 |
|  | (b) NK Ester EH-4E[1] | 70 | 560 | 70 | 560 | 70 | 560 |
|  | (c) Benzyl acrylate | 80 | 640 | 80 | 640 | 80 | 640 |
|  | (d) Styrene macromer | 40 | 360 | 40 | 360 | 40 | 360 |
| Solvent | MEK | 0 | 1200 | 0 | 1200 | 0 | 1200 |
| Polymerization initiator | V-65[2] | 0 | 16 | 0 | 16 | 0 | 16 |
| Chain transfer agent | 2-Mercapto ethanol | 0.6 | 4.2 | 0.6 | 4.2 | 0.6 | 4.2 |

|  |  | Polymer 5 | | |
|---|---|---|---|---|
|  |  | Initial charge monomer solution | Initial charge monomer solution | Initial charge monomer solution |
| Monomer | (a) Methacrylic acid | 0 | 0 | 0 |
|  | (b) NK Ester EH-4E[1] | 40 | 40 | 40 |
|  | (c) Benzyl acrylate | 80 | 80 | 80 |
|  | (d) Styrene macromer | 40 | 40 | 40 |
| Solvent | MEK | 0 | 0 | 0 |
| Polymerization initiator | V-65[2] | 0 | 0 | 0 |
| Chain transfer agent | 2-Mercapto ethanol | 0.6 | 0.6 | 0.6 |

[1]1,2-ethylhexy polyethylene glycol methacrylate (Trade name: NK Ester EH-4E, available from Shin Nakmura Chemical Co., Ltd.)
[2]2,2'-azobis(2,4-dimethylvaleronitrile (Trade name: V-65, available from Wako Pure Chemical Industries, Ltd.)

Preparation Example 2

Preparation of Pigment Water Dispersions 1-5

Step (1)

In a disper with a capacity of 2 L (T.K ROBOMIX, mixing section: HOMO DISPER Model 2.5, wing diameter: 40 mm, available from PRIMIX Corporation), a predetermined amount of the polymer shown in Table 2 was fed, and a predetermined amount of methyl ethyl ketone (MEK) shown in Table 2 was added with being stirred at 1400 rpm. In the mixture, ion-exchanged water and 5N (16.9 weight %) of sodium hydroxide solution were added and stirred at 1400 rpm for 15 minutes with being cooled in a water bath of 0° C. After the stirring, a predetermined amount of carbon black "Nipex160" (available from Degussa) shown in Table 2 was added in the mixture and stirred at 6000 rpm for 3 hours. The obtained mixture was dispersed under a pressure of 180 MPa by passing through a MICROFLUIDIZER (Model: M-140K, available from Microfluidics) 20 times.

Step (2)

By using a reduced pressure distillation device (rotary evaporator, trade name: N-1000S, available from TOKYO RIKAKIKAI CO., LTD.), the dispersed material was maintained under a pressure of 0.02 MPa in a hot bath adjusted to 40° C. for 2 hours to remove the organic solvent. Subsequently, the dispersed material is maintained under the pressure lowered to 0.01 MPa in the hot bath adjusted to 62° C. for 4 hours to further remove the organic solvent and a part of water, so as to adjust the total concentration of the pigment and the polymer to 23-25%. The total concentration of the pigment and the polymer was actually measured, and the concentration of the pigment was adjusted to 10% by using ion-exchanged water. Subsequently, the dispersed material was filtered with 5 μm and 1.2 μm membrane filters (trade name: Minisart, available from Sartorius) in turn to obtain each of the pigment water dispersions 1-5.

TABLE 2

|  | Pigment water dispersion 1 | Pigment water dispersion 2 | Pigment water dispersion 3 | Pigment water dispersion 4 | Pigment water dispersion 5 |
| --- | --- | --- | --- | --- | --- |
| Type of polymer | Polymer 1 | Polymer 2 | Polymer 3 | Polymer 4 | Polymer 5 |
| Polymer acid value | 130 | 78 | 98 | 163 | 196 |
| Pigment/polymer ratio | 70/30 | 70/30 | 70/30 | 70/30 | 70/30 |
| Polymer solution amount | 85.7 | 85.7 | 85.7 | 85.7 | 85.7 |
| Methyl ethyl ketone | 93 | 91 | 86 | 94 | 95 |
| 5N Aqueous NaOH | 23.6 | 14.2 | 17.7 | 29.5 | 35.4 |
| 25% Aqueous ammonia | 20.3 | 12.2 | 15.3 | 25.4 | 30.5 |
| Ion-exchanged water | 419.8 | 427.7 | 424.7 | 414.8 | 409.9 |
| Nipex 160 | 100 | 100 | 100 | 100 | 100 |
| Total | 742 | 731 | 729 | 749 | 756 |
| MEK/Water ration in Step 1 | 0.30 | 0.30 | 0.29 | 0.30 | 0.30 |

Preparation Example 3

Preparation of Self-Dispersible Carbon Dispersion 1

While 1000 g of self-dispersible carbon black dispersion SDP-100 available from Sensient Technologies Corporation (solid content concentration: 15%) was stirred with a stirrer, 19.3 g of 1 N of sodium hydroxide solution was added dropwise at a rate of 1 g/second. The total concentration of the pigment was measured, and the concentration of the pigment was adjusted to 10% by using ion-exchanged water.

Subsequently, the dispersed material was filtered with 5 μm and 1.2 μm membrane filters (trade name: Minisart, available from Sartorius) in turn to obtain the self-dispersible carbon dispersion 1.

Preparation Example 4

Preparation of Example Inks 1-6 and Comparative Inks 1-4

Any one of the pigment water dispersions 1-5 and the self-dispersible carbon dispersion 1, glycerine (reagent available from Wako Pure Chemical Industries, Ltd.), triethylene glycol (reagent available from Wako Pure Chemical Industries, Ltd.), trimethylolpropane (reagent available from Wako Pure Chemical Industries, Ltd.), Proxel LV(S) (biocide, 1,2-two-benzisothiazole-3(2H)-one, effective ingredient: 20%, available from Arch Chemicals, Japan, Inc.), Olfine® E1010 (surface active agent, ethylene oxide (10 mol) adduct of acetylene diol, available from Nissin Chemical Industry Co., Ltd.), and ion-exchanged water were added and mixed in respective predetermined amounts as shown in Table 3. The obtained mixture was filtered with a 0.45 μm membrane filter (trade name: Minisart, available from Sartorius) to obtain Example inks 1-6 and Comparative inks 1-4. The surface tensions at 20° C. of the obtained inks were 36 mN/m.

Examples 1-5 and Comparative Examples 1-5

Sample Print for Measurement of Optical Density and Measurement of Optical Density Ink delivery tubes for the two black channels of a thermal ink jet printer "LPP-6010N" (equipped with a Memjet® printhead) available from LG were pulled out and fed to respective inkbottles. With the printer altered to measure the weight variation of each inkbottle, at a temperature of 25±1° C. and a relative humidity of 30±5%, a 200% duty printed image was printed at a resolution of 1600 dpi in height and 1600 dpi in width in the best mode from the two black channels (i.e. overprinted black channels). As the recording media, a plain paper Engineering Bond paper available from Oce was used.

Subsequently, the print density of the obtained print sample on the plain paper, which is a value output as the black optical density, was measured at 5 points with a Macbeth densitometer(trade name: SpectroEye, available from Gretag Macbeth Corp, measurement conditions: observation field of view: 2°, observation light source: D50, whiteness: paper standard, polarized filter: none, density standard: ANSI-A). The average of the measured optical densities was calculated.

An optical density of 1.2 or more indicates sufficient print quality on plain paper. Preferably, the optical density is 1.25 or more.

For the fixability (rub-fastness) evaluation, a plain paper (plain paper Engineering Bond paper available from Oce) was applied to the bottom surface of a 460 g stainless steel weight (1 inch×1 inch) with a double-faced tape. Subsequently, the plain paper on the bottom surface of the weight was brought into contact with the printed surface of the printed materials obtained in each of the Examples and Comparative Examples, and scratched back and forth 10 times on the solid image in a width of 4 inches.

The plain paper applied to the weight was peeled off. The optical density of the rubbed area of the plain paper, which is a value output as the black optical density, was measured at 5 points with a Macbeth densitometer (trade name: SpectroEye, available from Gretag Macbeth Corp, measurement conditions: observation field of view: 2°, observation light source: D50, whiteness: paper standard, polarized filter: none, density standard: ANSI-T). The average of the measured optical densities was calculated. A lower optical density (of the paper applied to the weight) indicates excellent abrasion resistance.

For the fixability, an optical density of 0.05 or less indicates sufficient abrasion resistance. Preferably, the optical density is 0.03 or less.

The results are shown in Table 3 and discussed further below.

Example 6

Sample Print for Measurement of Optical Density and Measurement of Optical Density The printed material was obtained in the same way as Example 1 except that in a testing system for printing (trade name: OnePassJet, available from TRITEK CO., LTD.) equipped with an inkjet head (trade name: KJ4B-HDO6MHG-STDV, available from KYOCERA Corporation), the ink delivery tube is fed to an inkbottle and except that with a printer altered to measure the weight variation of the inkbottle, at a temperature of 25±1° C. and a relative humidity of 30±5%, a 200% duty printed image was printed at a resolution of 1200 dpi in width and 720 height in width by using Example Inks 1 and 4 with a droplet amount of 4 pl.

The results are shown in Table 3 and discussed further below.

Comparative Example 6

Sample Print for Measurement of Optical Density and Measurement of Optical Density The printed material was obtained in the same way as Example 6 except that the resolution was 600 dpi in width and 720 dpi in height and except that the droplet amount was 8 pl.

The results are shown in Table 3 and discussed further below.

TABLE 3

| | | Example 1 | Comparative Example 1 | Comparative Example 2 | Example 2 |
|---|---|---|---|---|---|
| Upstream Black Ink Channel 1 | Ink number | Example Ink 1 | Example Ink 4 | Comparative Ink 1 | Example Ink 2 |
| | Coloring material | Self-dispersible 1 | Pigment water dispersion 1 | Self-dispersible 1 | Self-dispersible 1 |
| | Concentration of pigment | 5 | 5 | 3 | 4 |
| | Polymer acid value | | 130 | | |
| | Droplet weight (ng) | 1.35 | 1.35 | 1.35 | 1.35 |
| Ink charged in Black Ink Channel 1 | Self-dispersible carbon dispersion 1 | 50 | | 30 | 40 |
| | Pigment water dispersion 1 | | 50 | | |
| | Glycerine | 5 | 5 | 5 | 5 |
| | Triethylene glycol | 5 | 5 | 5 | 5 |
| | Trimethylolpropane | 7 | 7 | 7 | 7 |
| | Olfine E1010 | 0.3 | 0.3 | 0.3 | 0.3 |
| | Proxel LV(S) | 0.1 | 0.1 | 0.1 | 0.1 |
| | Water | 32.6 | 32.6 | 52.6 | 42.6 |
| Downstream Black Ink Channel 2 | Ink number | Example Ink 4 | Example Ink 1 | Example Ink 4 | Example Ink 4 |
| | Coloring material | Pigment water dispersion 1 | Self-dispersible 1 | Pigment water dispersion 1 | Pigment water dispersion 1 |
| | Concentration of pigment | 5 | 5 | 5 | 5 |
| | Polymer Acid value | 130 | | 130 | 130 |
| | Droplet weight (ng) | 1.35 | 1.35 | 1.35 | 1.35 |
| Ink charged in Black Ink Channel 2 | Self-dispersible carbon dispersion 1 | | 50 | | |
| | Pigment water dispersion 1 | 50 | | 50 | 50 |
| | Pigment water dispersion 2 | | | | |
| | Pigment water dispersion 3 | | | | |
| | Pigment water dispersion 4 | | | | |
| | Pigment water dispersion 5 | | | | |
| | Glycerine | 5 | 5 | 5 | 5 |
| | Triethylene glycol | 5 | 5 | 5 | 5 |
| | Trimethylolpropane | 7 | 7 | 7 | 7 |
| | Olfine E1010 | 0.3 | 0.3 | 0.3 | 0.3 |
| | Proxel LV(S) | 0.1 | 0.1 | 0.1 | 0.1 |
| | Water | 32.6 | 32.6 | 32.6 | 32.6 |
| | A/B ratio | 1.0 | 1.0 | 0.6 | 0.8 |
| Ink printing | dpi in width | 1600 | 1600 | 1600 | 1600 |
| | dpi in height | 1600 | 1600 | 1600 | 1600 |
| | Amount of ink printed per square inch (mg/inch$^2$) | 6.91 | 6.91 | 6.91 | 6.91 |
| Evaluation result | Printed optical density | 1.25 | 0.97 | 1.02 | 1.2 |
| | Fixability (transfer to rubbed paper) | 0.03 | 0.01 | 0.02 | 0.03 |

TABLE 3-continued

|  |  | Example 3 | Comparative Example 3 | Comparative Example 4 | Example 4 |
| --- | --- | --- | --- | --- | --- |
| Upstream Black Ink Channel 1 | Ink number | Example Ink 3 | Comparative Ink 2 | Example Ink 1 | Example Ink 1 |
|  | Coloring material | Self-dispersible 1 | Self-dispersible 1 | Self-dispersible 1 | Self-dispersible 1 |
|  | Concentration of pigment | 6 | 7 | 5 | 5 |
|  | Polymer acid value |  |  |  |  |
|  | Droplet weight (ng) | 1.35 | 1.35 | 1.35 | 1.35 |
| Ink charged in Black Ink Channel 1 | Self-dispersible carbon dispersion 1 | 60 | 70 | 50 | 50 |
|  | Pigment water dispersion 1 |  |  |  |  |
|  | Glycerine | 5 | 5 | 5 | 5 |
|  | Triethylene glycol | 5 | 5 | 5 | 5 |
|  | Trimethylolpropane | 7 | 7 | 7 | 7 |
|  | Olfine E1010 | 0.3 | 0.3 | 0.3 | 0.3 |
|  | Proxel LV(S) | 0.1 | 0.1 | 0.1 | 0.1 |
|  | Water | 22.6 | 12.6 | 32.6 | 32.6 |
| Downstream Black Ink Channel 2 | Ink number | Example Ink 4 | Example Ink 4 | Comparative Ink 3 | Example Ink 5 |
|  | Coloring material | Pigment water dispersion 1 | Pigment water dispersion 1 | Pigment water dispersion 2 | Pigment water dispersion 3 |
|  | Concentration of pigment | 5 | 5 | 5 | 5 |
|  | Polymer Acid value | 130 | 130 | 80 | 100 |
|  | Droplet weight (ng) | 1.35 | 1.35 | 1.35 | 1.35 |
| Ink charged in Black Ink Channel 2 | Self-dispersible carbon dispersion 1 |  |  |  |  |
|  | Pigment water dispersion 1 | 50 | 50 |  |  |
|  | Pigment water dispersion 2 |  |  | 50 |  |
|  | Pigment water dispersion 3 |  |  |  | 50 |
|  | Pigment water dispersion 4 |  |  |  |  |
|  | Pigment water dispersion 5 |  |  |  |  |
|  | Glycerine | 5 | 5 | 5 | 5 |
|  | Triethylene glycol | 5 | 5 | 5 | 5 |
|  | Trimethylolpropane | 7 | 7 | 7 | 7 |
|  | Olfine E1010 | 0.3 | 0.3 | 0.3 | 0.3 |
|  | Proxel LV(S) | 0.1 | 0.1 | 0.1 | 0.1 |
|  | Water | 32.6 | 32.6 | 32.6 | 32.6 |
|  | A/B ratio | 1.2 | 1.4 | 1.0 | 1.0 |
| Ink printing | dpi in width | 1600 | 1600 | 1600 | 1600 |
|  | dpi in height | 1600 | 1600 | 1600 | 1600 |
|  | Amount of ink printed per square inch (mg/inch$^2$) | 6.91 | 6.91 | 6.91 | 6.91 |
| Evaluation result | Printed optical density | 1.27 | 1.35 | 1.24 | 1.23 |
|  | Fixability (transfer to rubbed paper) | 0.05 | 0.15 | 0.13 | 0.05 |

|  |  | Example 5 | Comparative Example 5 | Comparative Example 6 | Example 6 |
| --- | --- | --- | --- | --- | --- |
| Upstream Black Ink Channel 1 | Ink number | Example Ink 1 | Example Ink 1 | Example Ink 1 | Example Ink 1 |
|  | Coloring material | Self-dispersible 1 | Self-dispersible 1 | Self-dispersible 1 | Self-dispersible 1 |
|  | Concentration of pigment | 5 | 5 | 5 | 5 |
|  | Polymer acid value |  |  |  |  |
|  | Droplet weight (ng) | 1.35 | 1.35 | 4 | 8 |
| Ink charged in Black Ink Channel 1 | Self-dispersible carbon dispersion 1 | 50 | 50 | 50 | 50 |
|  | Pigment water dispersion 1 |  |  |  |  |
|  | Glycerine | 5 | 5 | 5 | 5 |
|  | Triethylene glycol | 5 | 5 | 5 | 5 |
|  | Trimethylolpropane | 7 | 7 | 7 | 7 |
|  | Olfine E1010 | 0.3 | 0.3 | 0.3 | 0.3 |
|  | Proxel LV(S) | 0.1 | 0.1 | 0.1 | 0.1 |
|  | Water | 32.6 | 32.6 | 32.6 | 32.6 |

TABLE 3-continued

| | Ink number | Example Ink 6 | Comparative Ink 4 | Example Ink 4 | Example Ink 4 |
|---|---|---|---|---|---|
| Downstream Black Ink Channel 2 | Coloring material | Pigment water dispersion 4 | Pigment water dispersion 5 | Pigment water dispersion 1 | Pigment water dispersion 1 |
| | Concentration of pigment | 5 | 5 | 5 | 5 |
| | Polymer Acid value | 163 | 196 | 130 | 130 |
| | Droplet weight (ng) | 1.35 | 1.35 | 4 | 8 |
| Ink charged in Black Ink Channel 2 | Self-dispersible carbon dispersion 1 | | | 50 | 50 |
| | Pigment water dispersion 1 | | | | |
| | Pigment water dispersion 2 | | | | |
| | Pigment water dispersion 3 | | | | |
| | Pigment water dispersion 4 | 50 | | | |
| | Pigment water dispersion 5 | | 50 | | |
| | Glycerine | 5 | 5 | 5 | 5 |
| | Triethylene glycol | 5 | 5 | 5 | 5 |
| | Trimethylolpropane | 7 | 7 | 7 | 7 |
| | Olfine E1010 | 0.3 | 0.3 | 0.3 | 0.3 |
| | Proxel LV(S) | 0.1 | 0.1 | 0.1 | 0.1 |
| | Water | 32.6 | 32.6 | 32.6 | 32.6 |
| | A/B ratio | 1.0 | 1.0 | 1.0 | 1.0 |
| Ink printing | dpi in width | 1600 | 1600 | 1200 | 600 |
| | dpi in height | 1600 | 1600 | 720 | 720 |
| | Amount of ink printed per square inch (mg/inch$^2$) | 6.91 | 6.91 | 6.91 | 6.91 |
| Evaluation result | Printed optical density | 1.21 | 1.02 | 1.20 | 1.11 |
| | Fixability (transfer to rubbed paper) | 0.02 | 0.01 | 0.04 | 0.12 |

Example 7

Sample Print for Measurement of Optical Density and Measurement of Optical Density The printed material was obtained in the same way as Example 1 except that the ink was ejected at 50% duty from each of the two black channels. The ink ejected from the second (downstream) black channel is controlled so as to eject a dot which is fully overlapped with a dot formed by the ink ejected from the first (upstream) black channel i.e. in-phase chequerboard prints from the two black channels.

Example 8

Sample Print for Measurement of Optical Density and Measurement of Optical Density The printed material was obtained in the same way as Example 1 except that the ink was ejected at 50% duty from each of the two black channels. In contrast with Example 7, the ink ejected from the second (downstream) black channel is controlled so as to form a dot which only partially overlaps with a dot formed by the ink ejected from the first (upstream) black channel. i.e. out-of-phase chequerboard prints from the two black channels. Partial overlapping of the printed dots is inevitable at the printing resolution due to droplet spread ("dot gain") when the droplets strike the print media.

The results are shown in Table 4 and discussed further below.

In the 100% duty testing in Examples 7 and 8, an optical density of 1.0 or more indicates sufficient print quality on plain paper. Preferably, the optical density is 1.1 or more.

In the 100% duty testing in Examples 7 and 8, an optical density of 0.05 or less in the fixability evaluation indicates sufficient abrasion resistance. Preferably, the optical density in the fixability evaluation is 0.03 or less.

TABLE 4

| | | Example 7 | Example 8 |
|---|---|---|---|
| Upstream Black Ink Channel 1 | Ink number | Example Ink 1 | Example Ink 1 |
| | Coloring material | Self-dispersible 1 | Self-dispersible 1 |
| | Concentration of pigment | 5 | 5 |
| | Droplet weight (ng) | 1.35 | 1.35 |
| Ink charged in Black Ink Channel 1 | Self-dispersible carbon dispersion 1 | 50 | 50 |
| | Glycerine | 5 | 5 |
| | Triethylene glycol | 5 | 5 |
| | Trimethylolpropane | 7 | 7 |
| | Olfine E1010 | 0.3 | 0.3 |
| | Proxel LV(S) | 0.1 | 0.1 |
| | Water | 32.6 | 32.6 |

TABLE 4-continued

|  |  | Example 7 | Example 8 |
|---|---|---|---|
| Downstream Black Ink Channel 2 | Ink number | Example Ink 4 | Example Ink 4 |
|  | Coloring material | Pigment water dispersion 1 | Pigment water dispersion 1 |
|  | Concentration of pigment | 5 | 5 |
|  | Polymer Acid value | 130 | 130 |
|  | Droplet weight (ng) | 1.35 | 1.35 |
| Ink charged in Black Ink Channel 2 | Pigment water dispersion 1 | 50 | 50 |
|  | Glycerine | 5 | 5 |
|  | Triethylene glycol | 5 | 5 |
|  | Trimethylolpropane | 7 | 7 |
|  | Olfine E1010 | 0.3 | 0.3 |
|  | Proxel LV(S) | 0.1 | 0.1 |
|  | Water | 32.6 | 32.6 |
|  | A/B ratio | 1.0 | 1.0 |
| Ink printing | dpi in width | 1600 | 1600 |
|  | dpi in height | 1600 | 1600 |
|  | Amount of ink printed per square inch (mg/inch$^2$) | 3.46 | 3.46 |
|  | Dot-on-Dot | ON | OFF |
| Evaluation result | Printed optical density | 1.1 | 1.05 |
|  | Fixability (transfer to rubbed paper) | 0.03 | 0.03 |

Example 9

Effect of Co-Solvents on Printhead Lifetime in Inks Containing Self-Dispersible Pigments Printhead lifetime tests were conducted in accordance with the method described below. Printhead integrated circuits (PHICs) having uncoated titanium aluminium nitride resistive heater elements were mounted individually for operation in a modified printing rig. Actuation pulse widths were controlled to replicate operation in an otherwise unmodified printer. Print quality, as determined by inspection of printed patterns, was assessed as a function of the number of actuations. Printhead lifetime was determined as the number of actuations after which print quality was deemed unacceptable. Print quality was deemed unacceptable when the majority of ejected droplets displayed discernible errors in vertical placement.

Inks A-D were formulated as described in Table 5 and filtered (0.8 microns) prior to use.

TABLE 5

|  | Ink A | Ink B | Ink C | Ink D |
|---|---|---|---|---|
| Self-dispersible carbon black dispersion (SDP-100) | 5.0% | 5.0% | 5.0% | 5.0% |
| Ethylene glycol | 7.0% |  |  |  |
| Triethylene glycol |  | 6.5% |  | 5.3% |
| Tetraethylene glycol |  |  | 6.0% |  |
| Glycerol | 15.6% | 15.7% | 14.4% | 12.6% |
| Trimethylolpropane | 9.8% | 9.1% | 8.4% |  |
| Glycerol ethoxylate[1] |  |  |  | 7.4% |
| Surfynol ® 465[2] | 0.5% | 0.5% | 0.5% | 0.5% |
| Water | balance | balance | balance | balance |

[1]Glycerol ethoxylate is ethoxylated glycerol, average M$_n$ approximately 1000, supplied by Sigma-Aldrich.
[2]Surfynol ® 465 is ethoxylated 2,4,7,9-tetramethyl-5-decyne-4,7-diol Inks A-D were tested in the modified printing rig described above and the print quality was assessed every ten million actuations. The results from these printhead lifetime tests are shown in Table 6.

TABLE 6

| Tested Ink | Printhead lifetime as number of actuations |
|---|---|
| Ink A | 10 million |
| Ink B | 50 million |
| Ink C | 10 million |
| Ink D | <10 million |

Discussion

The experimental results presented in Table 3, Table 4 and Table 6 demonstrate the advantages of the present invention.

Referring to Table 3, the advantages of overprinting the second ink containing a polymer-encapsulated carbon black pigment onto the first ink containing a self-dispersible carbon black (SDP100) are demonstrated by a comparison of Example 1 and Comparative Example 1. In Example 1, the second ink is overprinted onto the first ink and a black OD of 1.25 is achieved. By contrast, in Comparative Example 1, the second ink is overprinted onto the first ink and results in a much poorer black OD of only 0.97. Example 1 and Comparative Example 1 both have an acceptable fixability of 0.03 or less.

Referring to Table 3, the advantages of employing an A/B ratio satisfying the relationship of 0.8≤A/B≤1.2 are demonstrated by comparing Comparative Examples 2 and 3 with Examples 1-3. In Comparative Example 2, a low A/B ratio of 0.6 results in an inferior black OD of 1.02. On the other hand, in Comparative Example 3, a high A/B ratio of 1.4 results in an inferior fixability OD of 0.15. By contrast, each of Examples 1-3 all have an AB ratio satisfying the relationship of 0.8≤A/B≤1.2 and have an acceptable black OD (1.2 or more) and fixability OD (0.05 or less).

Referring to Table 3, the advantages of employing a polymeric dispersant having an acid value in the range of 100 to 170 are demonstrated by comparing Comparative Examples 4 and 5 with Examples 1, 4 and 5. In Comparative Example 4, a relatively low acid value of 80 results in an acceptably low fixability OD of 0.13. In Comparative Example 5, a relatively high acid value of 196 results in a low black OD of 1.02. By contrast, each of Examples 1, 4 and 5 employ a polymeric dispersant having an acid value in the range of 100 to 170, and have an acceptable black OD (1.2 or more) and fixability OD (0.05 or less). It is noted that Example 1, having an acid value of 130, has the best balance of black OD and fixability.

Referring to Table 3, the advantages of employing a droplet weight in the range of 1 ng to 4 ng are demonstrated by comparing Comparative Example 6 with Examples 1 and 6. In Comparative Example 6, a droplet weight of 8 ng gave a surprisingly low black OD of 1.11 and a relatively high fixability OD of 0.12. By contrast, each of Examples 1 and 6 employing a droplet weight in the range of 1 ng to 4 ng gave an acceptable black OD (1.2 or more) and fixability (0.04 or less). It is noted that Example 1, having a droplet weight of 1.35 ng, gave superior black OD and fixability compared to Example 6, having a droplet weight of 4 ng.

Referring to Table 4, the advantages of dot-on-dot overprinting are demonstrated by comparing Examples 7 and 8. Although both Examples 7 and 8 gave an acceptable black OD and fixability in the 100% duty (50%+50%) print test, Example 7 with dot-on-dot printing had superior black OD compared to Example 8.

Referring to Table 6, it can be seen that inks comprising triethylene glycol as the glycol component (Inks B and D) had surprisingly longer printhead lifetimes than inks containing either ethylene glycol or tetraethylene glycol as the glycol component (Inks A and C). Furthermore, from Table 6, it can be seen that the ink having no trimethylolpropane (Ink D) exhibited significantly inferior printhead lifetime compared to a similar ink containing trimethylolpropane.

From the results shown in Table 6, it was concluded that a co-solvent system comprising triethylene glycol and trimethylolpropane is particularly advantageous for improving the printhead lifetime of inks containing self-dispersible pigments, especially self-dispersible pigments having hydrophilic groups directly bonded to the pigment surface. Hitherto, the advantages of this co-solvent system had not been realized by the prior art. For example, U.S. Pat. No. 5,976,233 describes aqueous ink compositions comprising a self-dispersible pigment, glycerol, trimethylolpropane and a glycol component. U.S. Pat. No. 5,976,233 exemplifies diethylene glycol, ethylene glycol or thiodiglycol as the glycol component. However, U.S. Pat. No. 5,976,233 fails to appreciate the advantageous synergistic effect of triethylene glycol and trimethylolpropane, as demonstrated in Table 6, for improving printhead lifetime.

It will, of course, be appreciated that the present invention has been described by way of example only and that modifications of detail may be made within the scope of the invention, which is defined in the accompanying claims.

The invention claimed is:

1. A method of inkjet printing comprising the steps of:
   printing a first ink onto a print medium, the first ink comprising a first self-dispersible pigment in an amount A in terms of a wt. % of the first ink; and
   subsequently printing a second ink onto the print medium at least partially over the first ink, the second ink comprising a second pigment in an amount B, in terms of a wt. % of the second ink, and a polymeric dispersant encapsulating the second pigment;
   wherein:
   the first self-dispersible pigment and the second pigment have a same color;
   the amount A of the first pigment and the amount B of the second pigment have a relationship $0.8 \leq A/B \leq 1.2$;
   a polymer acid value of the polymeric dispersant is in the range of 100 to 170 KOH mg/g; and
   a weight-average molecular weight of the polymeric dispersant is in the range of 20,000 to 200,000.

2. The method of claim 1, wherein ejected droplet weights of the first ink and the second ink are in the range of 1 ng to 5 ng per droplet, and a difference in droplet weights between the first ink and the second ink is less than 0.3 ng per droplet.

3. The method of claim 1, wherein the second ink is printed over the first ink within a period of less than 10 milliseconds.

4. The method of claim 1, wherein the first self-dispersible pigment and the polymeric dispersant encapsulating the second pigment have a same surface polarity.

5. The method of claim 1, wherein the first self-dispersible pigment is a surface-modified derivative of the second pigment.

6. The method of claim 1, wherein the first self-dispersible pigment comprises hydrophilic groups directly bonded to a pigment surface.

7. The method of claim 6, wherein the first self-dispersible pigment comprises carboxylate groups directly bonded to the pigment surface, the first self-dispersible pigment being obtainable via oxidation of the second pigment.

8. The method of claim 1, wherein at least the first ink comprises trimethylolpropane.

9. The method of claim 8, wherein at least the first ink further comprises triethylene glycol.

10. The method of claim 1, wherein the first and second inks comprise the same co-solvents.

11. The method of claim 1, wherein the viscosities at 35° C. of the first ink and the second ink are in the range of 1.5 mPa·s to 4.0 mPa·s, and wherein a difference in viscosities at 35° C. between the first ink and the second ink is less than 0.5 mPa·s.

12. The method of claim 1, wherein the surface tensions at 20° C. of the first ink and the second ink are in the range of 28 mN/m to 40 mN/m, and a difference in surface tensions at 20 ° C. between the first ink and the second ink is less than 3 mN/m.

13. The method of claim 1, wherein the amount A and the amount B are each in the range of 2 wt % to 7 wt %.

14. An ink set for an inkjet printer comprising:
   a first ink comprising a first self-dispersible pigment in an amount A in terms of a wt. % of the first ink; and
   a second ink comprising a second pigment in an amount B, in terms of a wt. % of the second ink, and a polymeric dispersant encapsulating the second pigment,
   wherein:
   the first self-dispersible pigment and the second pigment have a same color;
   the amount A of the first pigment and the amount B of the second pigment have a relationship $0.8 \leq A/B \leq 1.2$;
   a polymer acid value of the polymeric dispersant is in the range of 100 to 170 KOH mg/g; and
   a weight-average molecular weight of the polymeric dispersant is in the range of 20,000 to 200,000.

15. The ink set of claim 14, wherein the first and second inks have one or more of the following physical properties:
   the viscosities at 35° C. of the first ink and the second ink are in the range of 1.5 mPa·s to 4.0 mPa·s;
   a difference in viscosities at 35° C. between the first ink and the second ink is less than 0.5 mPa·s;
   the surface tensions at 20° C. of the first ink and the second ink are in the range of 28 mN/m to 40 mN/m; and
   a difference in surface tensions at 20° C. between the first ink and the second ink is less than 3 mN/m.

16. The ink set of claim 14, wherein at least the first ink comprises one or more co-solvents selected from the group consisting of: triethylene glycol and trimethylolpropane.

* * * * *